(12) United States Patent
Kim et al.

(10) Patent No.: US 12,524,044 B2
(45) Date of Patent: Jan. 13, 2026

(54) WINDOW AND DISPLAY DEVICE INCLUDING THE SAME

(71) Applicant: SAMSUNG DISPLAY CO., LTD., Yongin-si (KR)

(72) Inventors: Sunghoon Kim, Hwaseong-si (KR); Seungho Kim, Asan-si (KR); Byunghoon Kang, Seoul (KR); Kyung-Man Kim, Anyang-si (KR); Sanghoon Kim, Hwaseong-si (KR); Yuri Kim, Guri-si (KR); Min-Hoon Choi, Seoul (KR); Seongjin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 363 days.

(21) Appl. No.: 18/171,100

(22) Filed: Feb. 17, 2023

(65) Prior Publication Data

US 2023/0280795 A1    Sep. 7, 2023

(30) Foreign Application Priority Data

Mar. 3, 2022  (KR) .......................... 10-2022-0027434

(51) Int. Cl.
*G06F 1/16* (2006.01)
*H04M 1/02* (2006.01)

(52) U.S. Cl.
CPC .......... *G06F 1/1656* (2013.01); *G06F 1/1616* (2013.01); *H04M 1/0222* (2013.01);
(Continued)

(58) Field of Classification Search
CPC .. G06F 1/1656; G06F 1/1616; H04M 1/0222; H04M 1/0268; Y10T 428/24479; Y10T 428/2457; Y10T 428/24587
See application file for complete search history.

(56) References Cited

U.S. PATENT DOCUMENTS 9,209,420 B2   12/2015  Han et al.
9,655,235 B2   5/2017   Hwang et al.
(Continued)

FOREIGN PATENT DOCUMENTS

CN       111445796        7/2020
KR    10-2016-0144912    12/2016
(Continued)

*Primary Examiner* — Donald M Flores, Jr.
(74) *Attorney, Agent, or Firm* — F. CHAU & ASSOCIATES, LLC

(57) ABSTRACT

A window includes a substrate including a folding portion foldable with respect to a folding axis extending in a first direction. A plurality of groove patterns are defined in the folding portion. The folding portion includes a center portion and an outer portion, and the plurality of groove patterns include a first groove pattern disposed in the center portion and a second groove pattern disposed in the outer portion. The first groove pattern includes a first upper groove pattern and a first lower groove pattern, and the second groove pattern includes a second upper groove pattern and a second lower groove pattern. The first upper groove pattern and the first lower groove pattern partially overlap in the second direction, and the second upper groove pattern and the second lower groove pattern do not overlap in the second direction.

15 Claims, 15 Drawing Sheets

(52) U.S. Cl.
CPC ... *H04M 1/0268* (2013.01); *Y10T 428/24479* (2015.01); *Y10T 428/2457* (2015.01); *Y10T 428/24587* (2015.01)

(56) References Cited

U.S. PATENT DOCUMENTS

| | | |
|---|---|---|
| 9,983,424 B2 | 5/2018 | Kim et al. |
| 10,020,462 B1 | 7/2018 | Ai et al. |
| 10,314,184 B2 | 6/2019 | Choi et al. |
| 2015/0090969 A1* | 4/2015 | Han ............... H10K 50/841 |
| | | 257/40 |
| 2021/0107829 A1* | 4/2021 | Chen ................ G06F 1/1637 |
| 2022/0011813 A1* | 1/2022 | Kim ................. G06F 1/1637 |
| 2023/0154360 A1* | 5/2023 | Zhao ................. B32B 3/266 |

FOREIGN PATENT DOCUMENTS

| | | |
|---|---|---|
| KR | 10-2017-0023231 | 3/2017 |
| KR | 10-2018-0079093 | 7/2018 |
| KR | 10-1958802 | 3/2019 |
| KR | 10-2056314 | 12/2019 |

\* cited by examiner

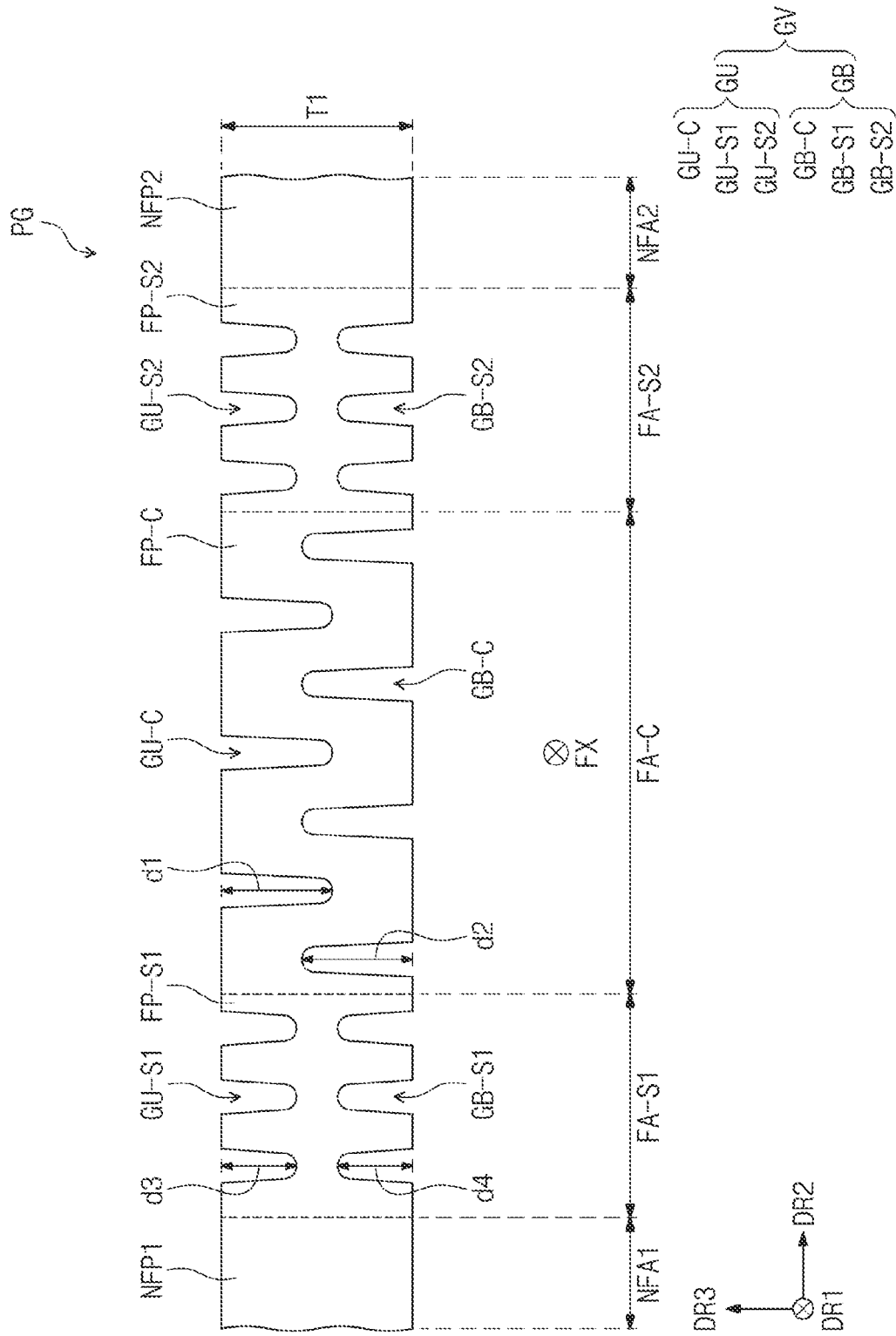

WINDOW AND DISPLAY DEVICE INCLUDING THE SAME

CROSS-REFERENCE TO RELATED APPLICATIONS

This U.S. non-provisional patent application claims priority under 35 U.S.C. § 119 to Korean Patent Application No. 10-2022-0027434, filed on Mar. 3, 2022, the disclosure of which is hereby incorporated by reference in its entirety.

TECHNICAL FIELD

Embodiments of the present disclosure relate to a window and a display device including the same, and more particularly, to a foldable window and a display device including the same.

DISCUSSION OF RELATED ART

Display devices are used in various multimedia devices such as, for example, television sets, mobile phones, tablet computers, and game consoles to provide image information to users. Recently, various types of flexible display devices which are foldable or bendable have been developed. The flexible display devices are variously modifiable in shape by being foldable, rollable, or bendable, and thus have increased portability.

The flexible display devices may include foldable or bendable display panels and windows. However, the windows of the flexible display devices may be deformed by folding or bending operations or easily damaged due to external shocks.

SUMMARY

Embodiments of the inventive concept provide a window having excellent folding characteristics and excellent mechanical properties.

Embodiments of the inventive concept also provide a display device including a window having excellent folding characteristics and excellent mechanical properties.

An embodiment of the inventive concept includes a window that includes a substrate including a folding portion foldable with respect to a folding axis extending in a first direction, and a first non-folding portion and a second non-folding portion spaced apart from each other in a second direction substantially perpendicular to the first direction with the folding portion disposed therebetween. A plurality of groove patterns each extending in the first direction and arranged in the second direction are disposed in the folding portion. The folding portion includes a center portion disposed adjacent to the folding axis, and an outer portion disposed between the center portion and each of the first non-folding portion and the second non-folding portion. The plurality of groove patterns include a first groove pattern defined in the center portion and a second groove pattern disposed in the outer portion. The first groove pattern includes a first upper groove pattern recessed from an upper surface of the substrate, and a first lower groove pattern recessed from a lower surface of the substrate. The second groove pattern includes a second upper groove pattern recessed from the upper surface of the substrate, and a second lower groove pattern recessed from the lower surface of the substrate. The first upper groove pattern and the first lower groove pattern partially overlap in the second direction, and the second upper groove pattern and the second lower groove pattern do not overlap in the second direction.

In an embodiment, the second upper groove pattern and the second lower groove pattern may overlap in a thickness direction of the substrate.

In an embodiment, the second upper groove pattern and the second lower groove pattern do not overlap in a thickness direction of the substrate.

In an embodiment, a depth of the second upper groove pattern may be substantially equal to a depth of the second lower groove pattern.

In an embodiment, a depth of the second upper groove pattern may be different from a depth of the second lower groove pattern.

In an embodiment, a depth of the second upper groove pattern may be greater than a depth of the second lower groove pattern.

In an embodiment, the substrate may have a thickness of about 100 μm to about 1000 μm.

In an embodiment, the plurality of groove patterns may be symmetrical with respect to the folding axis.

In an embodiment, each of the plurality of groove patterns may have a width in the second direction of about 20 μm to about 300 μm.

In an embodiment, the window according to an embodiment may further include a filling member disposed in each of the plurality of groove patterns.

In an embodiment, the filling member may include an elastic material.

In an embodiment, the first upper groove pattern and the first lower groove pattern do not overlap in a thickness direction of the substrate.

In an embodiment, a depth of the first upper groove pattern may be substantially equal to a depth of the first lower groove pattern.

In an embodiment, a depth of each of the first upper groove pattern and the first lower groove pattern may be about equal to at least half a thickness of the substrate.

In an embodiment, the plurality of groove patterns do not overlap the first non-folding portion and the second non-folding portion.

In an embodiment of the inventive concept, a window includes a substrate including a folding portion foldable with respect to a folding axis extending in a first direction, and a non-folding portion disposed adjacent to the folding portion, as well as a filling member. A plurality of groove patterns each extending in the first direction and arranged in a second direction substantially perpendicular to the first direction are defined in the folding portion. The folding portion includes a center portion disposed adjacent to the folding axis, and an outer portion disposed between the center portion and each of the first non-folding portion and the second non-folding portion. The plurality of groove patterns include a plurality of first groove patterns disposed in the center portion and a plurality of second groove patterns disposed in the outer portion. The plurality of first groove patterns include a plurality of first upper groove patterns recessed from an upper surface of the substrate, and a plurality of first lower groove patterns recessed from a lower surface of the substrate. The plurality of second groove patterns include a plurality of second upper groove patterns recessed from the upper surface of the substrate, and a plurality of second lower groove patterns recessed from the lower surface of the substrate. Each of the plurality of first upper groove patterns partially overlaps any adjacent first lower groove pattern among the plurality of first lower groove patterns with respect to the second direction, and each of the plurality of second upper groove patterns does not overlap any adjacent second lower groove pattern among the plurality of second lower groove patterns with respect to the second direction.

In an embodiment of the inventive concept, a display device includes a foldable display module and a window disposed on the foldable display module. The window is foldable with the foldable display module. The window includes a substrate including a folding portion foldable with respect to a folding axis extending in a first direction, and a first non-folding portion and a second non-folding portion spaced apart from each other in a second direction substantially perpendicular to the first direction with the folding portion disposed therebetween. A plurality of groove patterns each extending in the first direction and arranged in the second direction are disposed in the folding portion. The folding portion includes a center portion disposed adjacent to the folding axis, and an outer portion disposed between the center portion and each of the first non-folding portion and the second non-folding portion. The plurality of groove patterns include a first groove pattern defined in the center portion and a second groove pattern disposed in the outer portion. The first groove pattern includes a first upper groove pattern recessed from an upper surface of the substrate, and a first lower groove pattern recessed from a lower surface of the substrate. The second groove pattern includes a second upper groove pattern recessed from the upper surface of the substrate, and a second lower groove pattern recessed from the lower surface of the substrate. The first upper groove pattern and the first lower groove pattern partially overlap in the second direction, and the second upper groove pattern and the second lower groove pattern do not overlap in the second direction.

In an embodiment, the lower surface of the substrate may be adjacent to the display module, and the upper surface of the substrate may be spaced apart from the display module with the lower surface therebetween.

BRIEF DESCRIPTION OF THE DRAWINGS

The above and other features of the inventive concept will become more apparent by describing in detail embodiments thereof with reference to the accompanying drawings, in which:

FIGS. 6A to 6E are cross-sectional views each showing a substrate included in a window according to an embodiment of the inventive concept;

DETAILED DESCRIPTION

Figure 1:
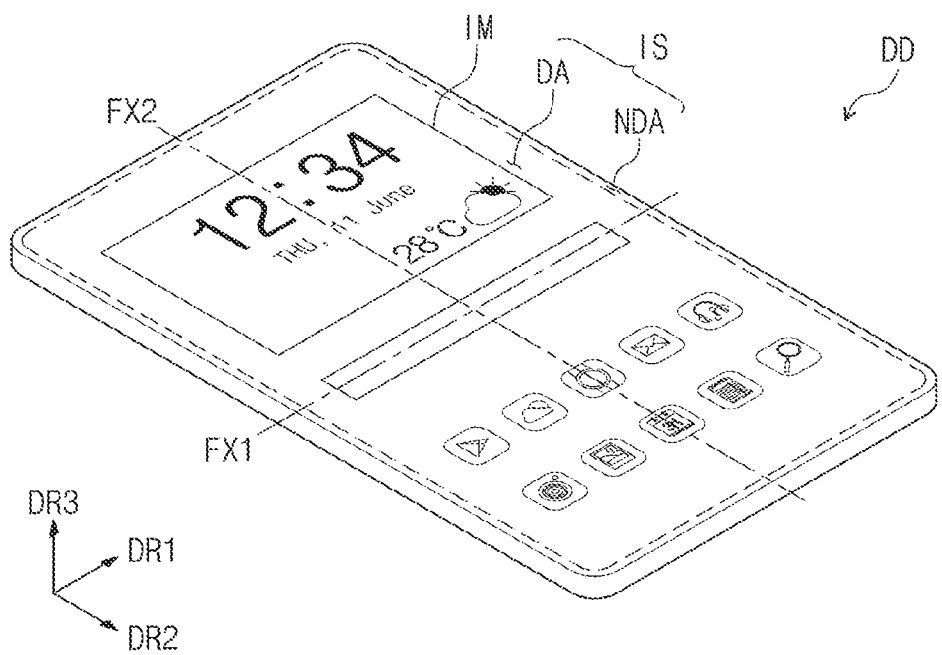
FIG. 1 is a perspective view showing an unfolded display device according to an embodiment of the inventive concept.

Embodiments of the inventive concept will be described more fully hereinafter with reference to the accompanying drawings. Like reference numerals may refer to like elements throughout the accompanying drawings.

It will be understood that when a component such as a film, a region, a layer, a portion, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

The term "and/or," includes all combinations of one or more of which associated configurations may define.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the teachings of the present disclosure. The singular forms are intended to include the plural forms as well, unless the context clearly indicates otherwise.

Also, terms of "below", "on lower side", "above", "on upper side", etc. may be used to describe the relationships of the components illustrated in the drawings. The terms are used as a relative concept and are described with reference to the direction indicated in the drawings.

It should be understood that the terms "comprise" or "have" are intended to specify the presence of stated features, integers, steps, operations, elements, components, or combinations thereof in the disclosure, but do not preclude the presence or addition of one or more other features, integers, steps, operations, elements, components, or combinations thereof.

As used herein, being "disposed directly on" means that there is no additional layer, film, region, plate, etc. disposed between a part and another part such as a layer, a film, a region, a plate, etc. For example, being "disposed directly on" may mean that two layers or two members are disposed without using an additional member such as an adhesive member therebetween.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art.

FIG. 1 is a perspective view showing an unfolded display device according to an embodiment of the inventive concept. FIGS. 2A to 2D are perspective views each showing a folded display device according to an embodiment of the inventive concept.

A display device DD may be a device activated according to electrical signals and thus providing an image IM. The display device DD may be used in multiple electronic devices for displaying the image IM. For example, the display device DD may not only be used for large-sized electronic devices such as television sets, monitors, etc., but also used for small-sized and medium-sized electronic devices such as mobile phones, tablets, car navigation units, game consoles, etc. However, the display device DD is not limited to the examples described above and may be used in various electronic devices.

Referring to FIG. 1, a front surface of the display device DD may be defined as a display surface IS. In an unfolded state, the display surface IS of the display device DD may correspond to a plane defined by a first direction DR1 and a second direction DR2 crossing the first direction DR1. The display surface IS may display the image IM in an upward direction, that is, towards a third direction DR3.

Although the drawings used herein show the first to third directions DR1 to DR3, it is to be understood that the first to third directions DR1, DR2, and DR3 described herein are relative concepts, and may thus be changed to other directions. In each of the drawings, directions indicated by the first to third directions DR1, DR2, and DR3 are shown using the same reference numerals.

As used herein, a front surface (or an upper surface) and a rear surface (or a lower surface) of respective members may be defined with respect to a direction in which the image IM is displayed. The upper and lower surfaces may oppose each other in the third direction DR3, and a normal direction of each of the upper and lower surfaces may correspond to the third direction DR3. The distance between the upper surface and the lower surface along the third direction DR3 may correspond to a thickness of a member. As used herein, "on a plane" may correspond to a view of a member in the third direction DR3.

The display surface IS of the display device DD may include a display area DA and a non-display area NDA. The display area DA is a portion in which the image IM is displayed. The non-display area NDA is a portion in which the image IM is not displayed. Users may view the image IM displayed through the display area DA. The image IM may be dynamic images (e.g., video) or still images. FIG. 1 shows a plurality of application icons and clock widgets as an example of the image IM.

The display area DA may have a tetragonal shape. However, this is presented as an example, and the shape of the display area DA may be variously designed. The non-display area NDA may surround the display area DA. However, the inventive concept is not limited thereto, and according to embodiments, the non-display area NDA may be placed adjacent to only one side of the display area DA, or may be omitted.

As shown in in FIG. 1, when viewed on a plane, the display device DD has a short side (relative to a long side) extending in the first direction DR1, a long side (relative to the short side) extending in the second direction DR2, and a rectangular shape having rounded corners. However, the shape of the display device DD is not limited thereto, and the display devices DD may be variously shaped and provided according to embodiments.

Although the display device DD in which a cross-sectional display surface IS is defined is presented as an example, the display device DD is not limited thereto. For example, according to embodiments, the display device DD may have various configurations, including a configuration having a double-sided display surface in which the display surface IS is defined in both the cross-section and the rear surface.

The display device DD may be a foldable display device. The display device DD may be folded with respect to a virtual folding axis extending in a predetermined direction. The virtual folding axis may also be referred to herein as an imaginary folding axis or a folding axis. FIG. 1 shows, as an example, a first folding axis FX1 extending in the first direction DR1 and a second folding axis FX2 extending in the second direction DR2. The first folding axis FX1 may be substantially parallel to the short-side direction of the display device DD. The second folding axis FX2 may be substantially parallel to the long-side direction of the display device DD. The display device DD of an embodiment may be folded with respect to at least one of the first folding axis FX1 or the second folding axis FX2.

Figure 2A:
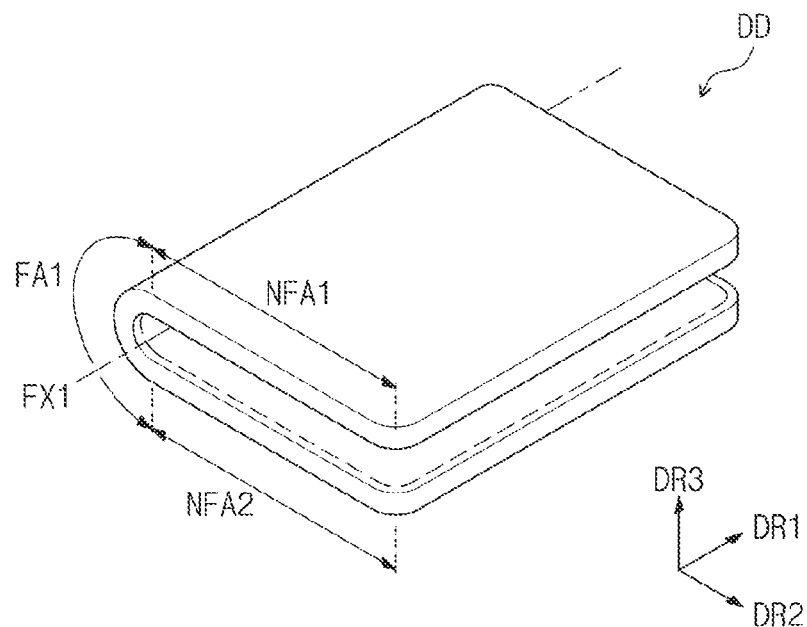
FIGS. 2A to 2D are perspective views each showing a folded display device according to an embodiment of the inventive concept.
Figure 2B:
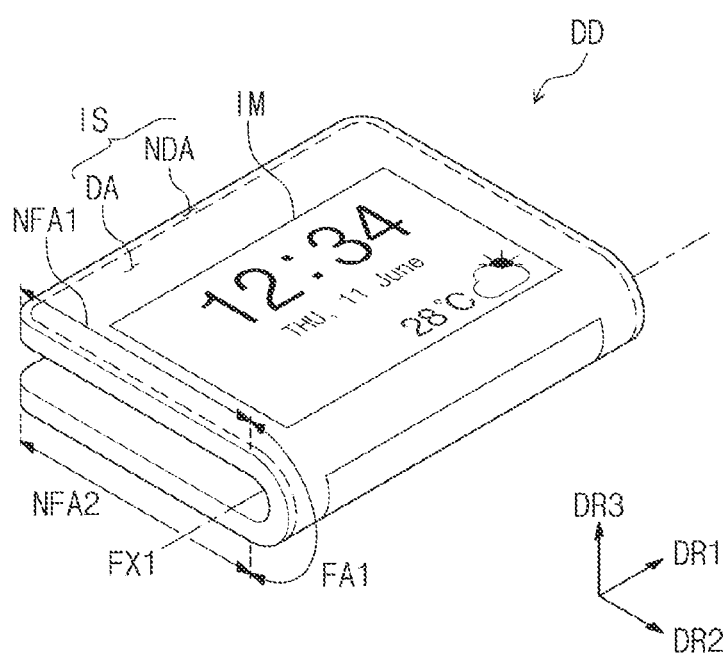
Figure 2C:
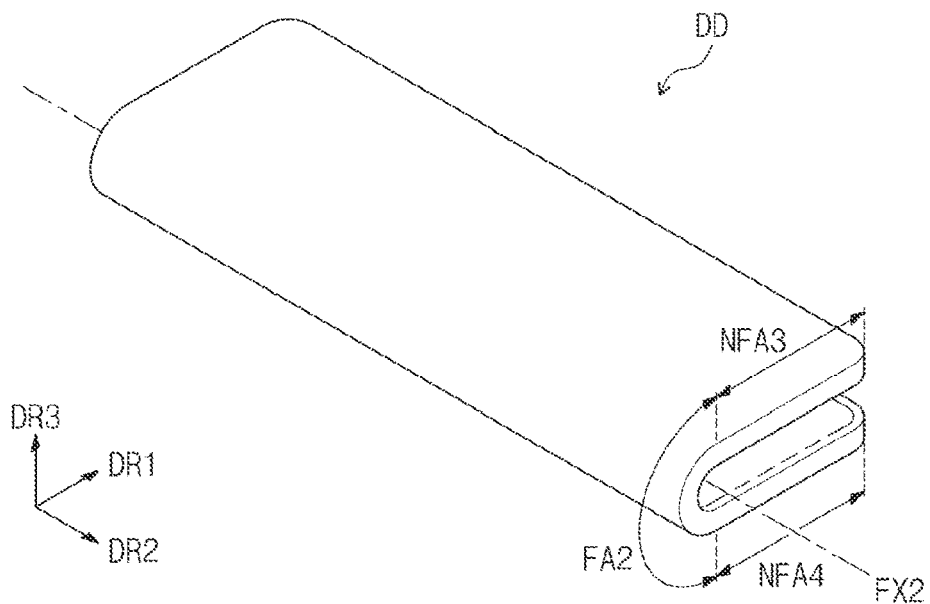
Figure 2D:
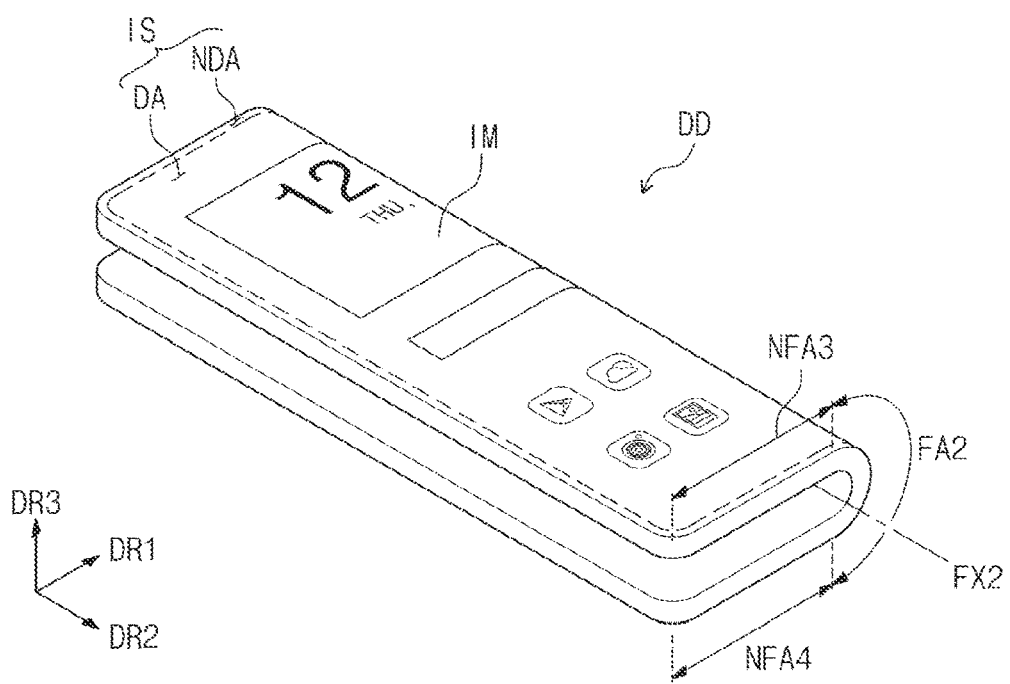

FIGS. 2A and 2B are perspective views of a display device DD according to an embodiment, which is folded with respect to a first folding axis FX1. FIGS. 2C and 2D are perspective views of a display device DD according to an embodiment, which is folded with respect to a second folding axis FX2.

The display device DD may be divided into a folding area and a non-folding area according to operation modes. The folding area may be a portion curved to have a predetermined curvature when the display device DD is folded with respect to a folding axis. The non-folding area may be a flat portion when the display device DD is folded with respect to a folding axis.

The display device DD may include at least one folding area and one non-folding area. FIGS. 2A to 2D show embodiments of the display device DD including one folding area and two non-folding areas adjacent to the folding area with respect to one folding axis. However, the inventive concept is not limited thereto. For example, according to embodiments, the display device DD may include a plurality of folding areas each folded with respect to a plurality of folding axes. The number of folding areas and non-folding areas included in the display device DD is not particularly limited.

Referring to FIGS. 2A and 2B, the display device DD folded with respect to the first folding axis FX1 has a first folding area FA1, a first non-folding area NFA1, and a second non-folding area NFA2. The first folding area FA1 may be a portion that surrounds the first folding axis FX1 and is folded with a predetermined curvature. The first non-folding area NFA1 may be placed adjacent to one side of the first folding area FA1 in the second direction DR2, and the second non-folding area NFA2 may be placed adjacent to the other side of the first folding area FA1 in the second direction DR2.

Referring to FIGS. 2C and 2D, the display device DD folded with respect to the second folding axis FX2 may include a second folding area FA2, a third non-folding area NFA3, and a fourth non-folding area NFA4. The second folding area FA2 may be a portion that surrounds the second folding axis FX2 and is folded with a predetermined curvature. The third non-folding area NFA3 may be placed adjacent to one side of the second folding area FA2 in the first direction DR1, and the fourth non-folding area NFA4 may be placed adjacent to the other side of the second folding area FA2 in the first direction DR1.

The display device DD may be in-folded or out-folded. That the display surface IS overlapping a folding area of the display device DD is folded to face a folding axis may be defined as in-folding. That the rear surface overlapping a folding area of the display device DD is folded to face a folding axis may be defined as out-folding. The display device DD may be manufactured to enable both in-folding and out-folding, or may be manufactured to enable any one of in-folding or out-folding.

FIG. 2A shows a display device DD in-folded with respect to a first folding axis FX1, and FIG. 2C shows a display device DD in-folded with respect to a second folding axis FX2. FIG. 2B shows a display device DD out-folded with respect to a first folding axis FX1, and FIG. 2C shows a display device DD out-folded with respect to a second folding axis FX2.

Referring to FIG. 2A, the display surfaces IS overlapping the first non-folding area NFA1 and the second non-folding area NFA2 of the in-folded display device DD may face each other. Referring to FIG. 2C, the display surfaces IS overlapping the third non-folding area NFA3 and the fourth non-folding area NFA4 of the in-folded display device DD may face each other. The rear surface of the in-folded display device DD may be exposed to the user.

Referring to FIG. 2B, the display surfaces IS overlapping the first non-folding area NFA1 and the second non-folding area NFA2 of the out-folded display device DD may be exposed to the user in directions opposite to each other. Referring to FIG. 2D, the display surfaces IS overlapping the third non-folding area NFA3 and the fourth non-folding area NFA4 of the out-folded display device DD may be exposed to the user in directions opposite to each other. Thus, the user may view the image IM provided from the display device DD in a folded state.

Figure 3:
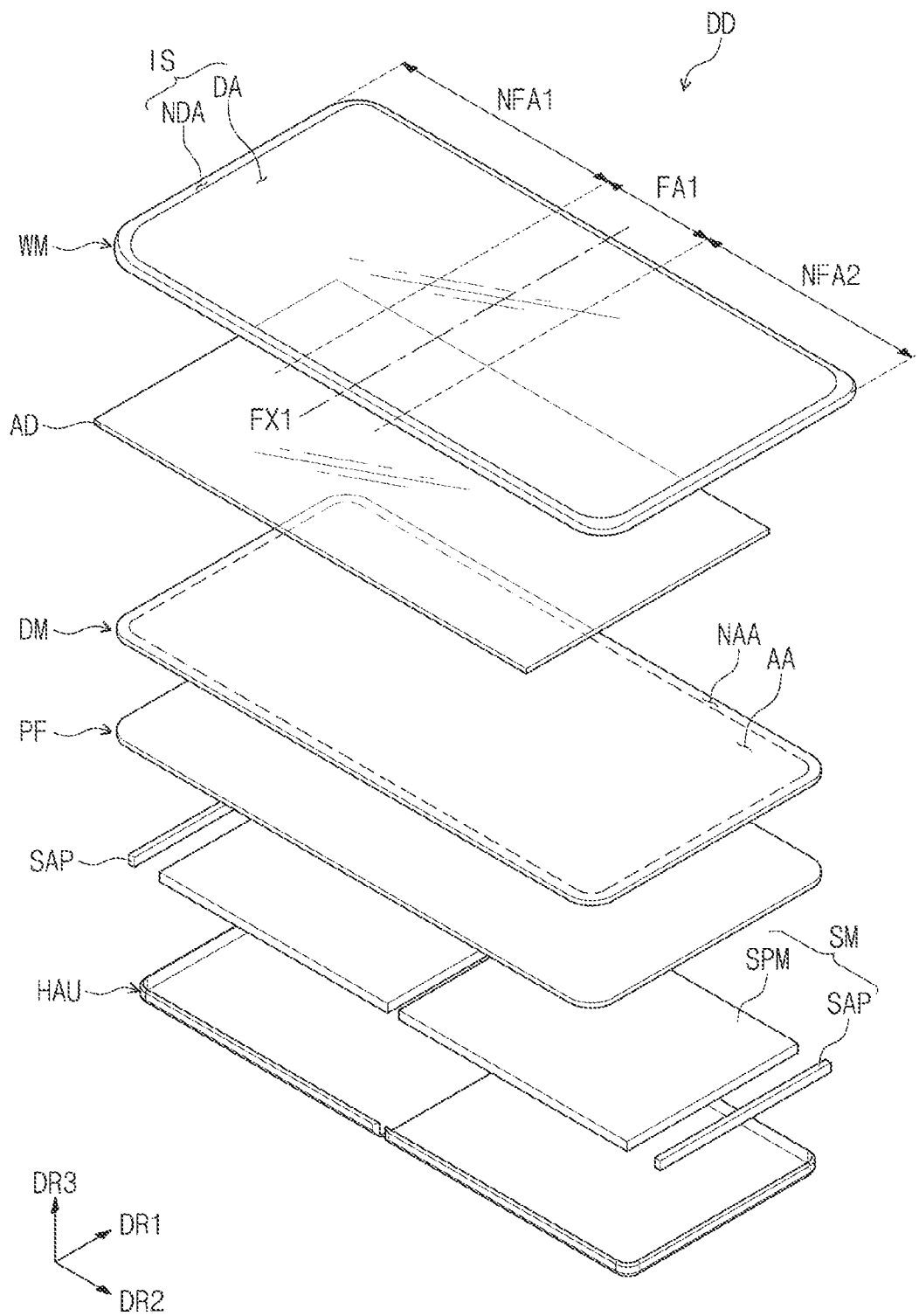
FIG. 3 is an exploded perspective view of a display device according to an embodiment of the inventive concept.

FIG. 3 is an exploded perspective view of a display device according to an embodiment of the inventive concept. FIG. 3 shows, as an example, an exploded perspective view of a display device DD that is foldable with respect to the first folding axis FX1. The display device DD may include a display module DM, a window WM, and an adhesive layer AD. In an embodiment, the display device DD may include a lower module SM and a protection layer PF disposed below the display module DM.

The display module DM may display images according to electrical signals, and transmit and receive information on external inputs. The display module DM may include an active area AA and a peripheral area NAA.

The active area AA may be defined as a portion activated according to electrical signals. For example, the display module DM may output images through the active area AA or detect various types of external inputs. The active area AA may correspond to at least a portion of the display area DA.

The peripheral area NAA may be adjacent to the active area AA. For example, the peripheral area NAA may surround the active area AA. However, this is presented merely as an example, and the inventive concept is not limited thereto. For example, according to embodiments, the peripheral area NAA may be defined in various forms such as being adjacent to only one side of the active area AA. The peripheral area NAA may correspond to at least a portion of the non-display area NDA.

According to embodiments, the display module DM may include a display panel. The display module DM may also be referred to herein as a display panel. The display panel may generate images output from the display module DM. The display panel may be, for example, a light emitting-type display panel, but is not particularly limited thereto. For example, the display panel may be an organic light emitting display panel or a quantum-dot light emitting display panel. The display module DM may further include an input sensor disposed on the display panel and sensing external inputs.

The display module DM may include a plurality of pixels disposed in the active area AA and a circuit unit disposed in the peripheral area NAA. The circuit unit may provide electrical signals to the pixels to drive the pixels. The pixels may be arranged to form light emitting patterns in the active area AA. The light emitting patterns of the pixels to which the electrical signals are applied from the circuit unit may emit light in response to the electrical signals, thereby outputting images in the active area AA.

The window WM may be disposed on the display module DM. The window WM may cover the entire upper surface of the display module DM. The shape of the window WM may correspond to the shape of the display module DM. The window WM may mitigate external shocks, which may thereby prevent or reduce damage or malfunctioning of the display module DM.

The window WM may include an optically transparent material. The window WM may include an optically transparent substrate, which will be described in further detail below. For example, the window WM may include a glass substrate, and the glass substrate may be a tempered glass substrate.

The window WM may have a single-layer structure or a multi-layer structure. For example, the window WM may have a single-layer structure including a glass substrate, but is not limited thereto, and may be a multi-layer structure including a coating film coated on a glass substrate, a filling member, or a polymer film disposed on a glass substrate.

A front surface of the window WM may correspond to a front surface of the display device DD. The front surface of the window WM may correspond to the display surface IS of the display device DD, which is described above. The window WM may include the display area DA and the non-display area NDA, which are described above.

The display area DA of the window WM may transmit images output from the display module DM. Users may view the images through the display area DA of the window WM. The window WM may overlap the non-display area NDA to have a predetermined color. For example, the window WM may overlap the non-display area NDA to further include a printing layer formed on a glass substrate.

The window WM may be flexible. The window WM may be folded along with the display module DM with respect to the folding axis FX. The window WM may include a first folding area FA1 that is bent to have a predetermined curvature when folded with respect to the folding axis FX, and a plurality of non-folding areas NFA1 and NFA2 which are adjacent to the first folding area FA1.

In FIG. 3, the window WM is shown to have a rectangular shape with rounded corners. However, this is presented merely as an example, and the window WM may be variously shaped to correspond to the display module DM according to embodiments. The shape of the window WM may vary depending on the design of a substrate manufactured through a window WM manufacturing process.

The adhesive layer AD may be disposed between the window WM and the display module DM. The adhesive layer AD may bond the window WM with the display module DM. The adhesive layer AD may be an optically clear adhesive film (OCA) or an optically clear adhesive resin layer (OCR). The adhesive layer AD may be formed as a single body with a filling member of the window WM, which will be described further below. However, the adhesive layer AD is not limited thereto. In an embodiment, the adhesive layer AD may be omitted.

According to embodiments, the display device DD may further include at least one functional layer disposed between the display module DM and the window WM. For example, the display device DD may further include an anti-reflection layer that reduces reflectance of external light incident from an upper side of the window WM.

The display device DD of an embodiment may include a housing HAU accommodating the display module DM, the lower module SM, and additional components of the display device DD. The housing HAU may be combined with the window WM.

According to embodiments, the housing HAU may further include a hinge structure to implement folding or bending. As shown in FIG. 3, the housing HAU may include a first housing and a second housing spaced apart from each other in the second direction DR2, and the first housing and the second housing may be connected to each other through a hinge structure portion. Upon the folding and unfolding operations of the display device DD, the display device DD may perform the folding and unfolding operations with respect to the hinge structure portion.

In the display device DD according to an embodiment, the protection layer PF may be disposed below the display module DM and may protect the display module DM from external shocks. The protection layer PF may be, for example, a polymer film such as a polyimide film or a polyethylene terephthalate film.

In the display device DD according to an embodiment, the lower module SM may include a support member SPM and a filling portion SAP. The support member SPM may be a portion overlapping most of the display module DM. The filling portion SAP may be a portion disposed outside the support member SPM and overlapping the outer portion of the display module DM.

The support member SPM may include, for example, at least one of a support plate, a cushion layer, a shielding layer, or an interlayer bonding layer formed of a metal material or a polymer material. The support member SPM may support the display module DM and/or may prevent or reduce deformation of the display module DM due to an external shock or force.

The cushion layer may include, for example, a sponge, foam, or elastomer such as a urethane resin. In addition, the cushion layer may be formed including at least one of, for example, an acrylic polymer, a urethane-based polymer, a silicone-based polymer, or an imide-based polymer. The shielding layer may be an electromagnetic wave shielding layer or a heat dissipation layer. In addition, the shielding layer may serve as an adhesive layer. The interlayer bonding layer may be provided in the form of an adhesive resin layer or an adhesive tape. The interlayer bonding layer may bond members included in the support member SPM.

The filling portion SAP may be disposed outside the support member SPM. The filling portion SAP may be disposed between the support member SPM and the housing HAU. The filling portion SAP may fill a space between the protection layer PF and the housing HAU, and may fix the protection layer PF.

According to embodiments, the display device DD may further include an adhesive layer disposed between the protection layer PF and the lower module SM. The adhesive layer AD may be, for example, an optically clear adhesive film (OCA) or an optically clear adhesive resin layer (OCR).

Figure 4:
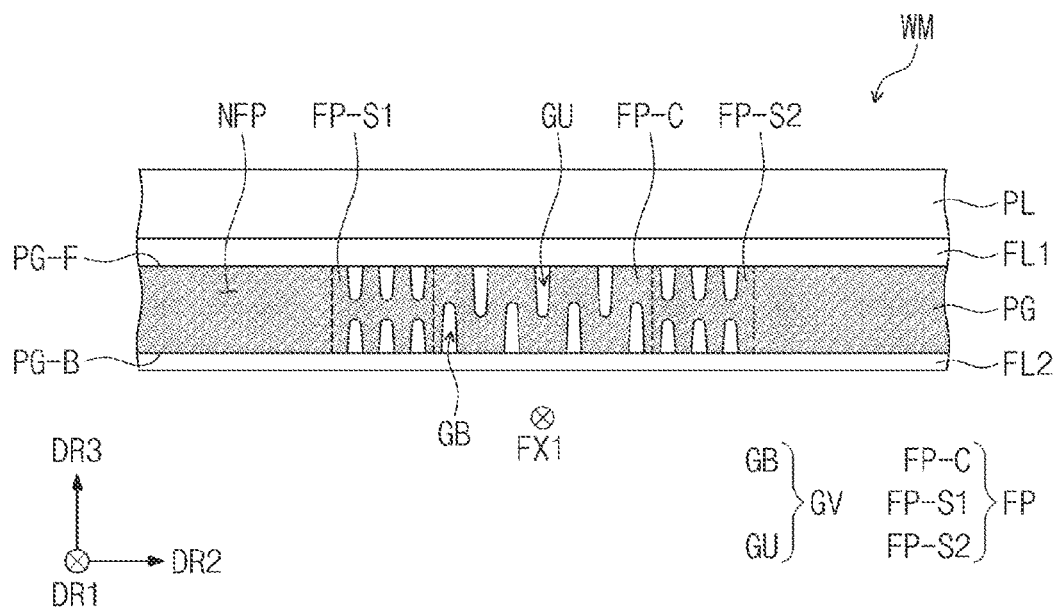
FIG. 4 is a cross-sectional view of a window according to an embodiment of the inventive concept.

FIG. 4 is a cross-sectional view of a window according to an embodiment of the inventive concept. FIG. 4 is a cross-sectional view of an embodiment in which a window WM is taken in a cross-section defined by the second direction DR2 and the third direction DR3.

Referring to FIG. 4, the window WM may include a substrate PG and a protection layer PL. The window WM of an embodiment may further include functional layers FL1 and FL2 disposed above or below the substrate PG. The functional layers FL1 and FL2 may include a first functional layer FL1 disposed above the substrate PG and a second functional layer FL2 disposed below the substrate PG.

The substrate PG may include an optically transparent material. For example, the substrate PG may include a glass substrate, and the glass substrate may be a chemically strengthened glass substrate. Utilizing a glass substrate for the substrate PG may result in excellent aesthetics, and may prevent or reduce nicks or scratches caused by sharp materials.

The substrate PG may include an upper surface PG-F and a lower surface PG-B that oppose each other. In an embodiment, the upper surface PG-F and the lower surface PG-B may face each other in the third direction DR3. The substrate PG may have a predetermined thickness along the third direction DR3. The thickness of the substrate PG may affect impact resistance of the substrate PG. When the substrate PG is too thin, the substrate PG may be broken or damaged by shocks (e.g., shocks caused by a pen drop) concentrated on a local region. When the substrate PG is too thick, the substrate PG may have reduced flexibility or may be broken upon folding. For example, the substrate PG may have a thickness of about 100 μm or greater. In an embodiment, the substrate PG may have a thickness of about 100 μm to about 1000 μm. In an embodiment, the substrate PG may have a thickness of about 300 μm to about 700 μm. However, the thickness of the substrate PG is not necessarily limited to the numerical examples above. When the thickness of the substrate PG satisfies the above ranges, impact resistance of the substrate PG may be secured, and the display module DM to be disposed below the substrate PG may be protected from external shocks.

The substrate PG may include a folding portion FP and a non-folding portion NFP arranged along the second direction DR2 crossing the first direction DR1 which is a direction the first folding axis FX1 extends. The folding portion FP may be a portion folded with respect to the first folding axis FX1 extending in the first direction DR1. The non-folding portion NFP may be a portion adjacent to the folding portion FP. The non-folding portion NFP may be a portion that is not folded with respect to the first folding axis FX1 and remains flat. The non-folding portion NFP may be disposed on both sides of the folding portion FP in the second direction DR2.

A plurality of groove patterns GV are defined in the folding portion FP. Each of the plurality of groove patterns GV may extend in the first direction DR1 and may be arranged in the second direction DR2. At least some of the plurality of groove patterns GV may be arranged to be spaced apart from each other in the second direction DR2, and may be defined to overlap each other in the third direction DR3 which is a thickness direction among the plurality of groove patterns GV. The plurality of groove patterns GV may include an upper groove pattern GU having a shape recessed from the upper surface PG-F and a lower groove pattern GB having a shape recessed from the lower surface PG-B.

FIG. 4 shows, as an example, nine upper groove patterns GU and ten lower groove patterns GB recessed along the third direction DR3 in the folding portion FP. However, the number of each of the upper groove patterns GU and the lower groove patterns GB is not limited thereto. For example, according to embodiments, each of the upper groove patterns GU and the lower groove patterns GB may be provided in a number of two or more.

The non-folding portion NFP may be a portion adjacent to the folding portion FP. According to embodiments, the upper groove patterns GU and the lower groove patterns GB are not defined in the non-folding portion NFP.

The folding portion FP may include the upper groove patterns GU and the lower groove patterns GB. As a result, the folding portion FP may have increased folding characteristics compared to the non-folding portion NFP. For example, the folding portion FP may include the upper groove patterns GU and the lower groove patterns GB to be relatively thinner in part than the non-folding portion NFP, and to have increased flexibility. Accordingly, stress applied to the substrate PG when the display device DD is folded may be reduced, and damage due to the folding of the substrate PG may be prevented or reduced.

The definitions of a folding portion FP and a non-folding portion NFP may be relative according to a folding direction. The substrate PG according to an embodiment may be folded with respect to each of the first folding axis FX1 and the second folding axis FX2 shown in FIG. 1, and a folding portion FP and a non-folding portion NFP defined when the substrate PG is folded with respect to the first folding axis FX1 may be different from a folding portion FP and a non-folding portion NFP defined when the substrate PG is folded with respect to the second folding axis FX2.

The folding portion FP includes a center portion FP-C adjacent to the first folding axis FX1, and a first outer portion FP-S1 and a second outer portion FP-S2 spaced apart from the first folding axis FX1 as compared to the center portion FP-C. The first outer portion FP-S1 and the second outer portion FP-S2 may be collectively referred to as an outer portion. For example, a distance between each of the first outer portion FP-S1 and the second outer portion FP-S2 and the first folding axis FX1 may be greater than a distance between the center portion FP-C and the first folding axis FX1. The first outer portion FP-S1 and the second outer portion FP-S2 may be disposed between the folding portion FP and the non-folding portion NFP. The first outer portion FP-S1 and the second outer portion FP-S2 may be spaced apart from each other with the center portion disposed FP-C therebetween.

In the substrate PG included in the window WM according to an embodiment, groove patterns defined in the center portion FP-C and groove patterns defined in the first and second outer portions FP-S1 and FP-S2 may be different in at least one of a cross-sectional shape or an arrangement. For example, the upper groove patterns GU defined in the center portion FP-C and the upper groove patterns GU defined in the first and second outer portions FP-S1 and FP-S2 may be different in at least one of a cross-sectional shape or an arrangement, and the lower groove patterns GB defined in the center portion FP-C and the lower groove patterns GB defined in the first and second outer portions FP-S1 and FP-S2 may be different in at least one of a cross-sectional shape or an arrangement. Detailed descriptions thereof will be provided below with reference to FIGS. 6A to 6E.

The first functional layer FL1 and the second functional layer FL2 may be disposed on the upper and lower portions of the substrate PG, respectively. Each of the first functional layer FL1 and the second functional layer FL2 may overlap the folding portion FP and the non-folding portion NFP of the substrate PG.

In an embodiment, the upper groove patterns GU and the lower groove patterns GB may be filled by the first functional layer FL1 and the second functional layer FL2. In an embodiment, the first functional layer FL1 and the second functional layer FL2 may be provided only in the folding portion FP to fill the upper groove patterns GU and the lower groove patterns GB.

As shown in FIG. 4, the upper and lower surfaces of the first functional layer FL1 and the upper and lower surfaces of the second functional layer FL2 may be flat. Alternatively, unlike what is shown, in an embodiment, the upper groove patterns GU and the lower groove patterns GB may be filled by the first functional layer FL1 and the second functional layer FL2.

Each of the first functional layer FL1 and the second functional layer FL2 may be a layer including an adhesive material. For example, each of the first functional layer FL1 and the second functional layer FL2 may be an optically clear adhesive film (OCA) or an optically clear adhesive resin layer (OCR). The first functional layer FL1 and the second functional layer FL2 may include a synthetic resin material. In an embodiment, the first functional layer FL1 and the second functional layer FL2 may include a material having the same refractive index as that of the substrate PG. For example, the first functional layer FL1 and the second functional layer FL2 may include at least one of, for example, a urethane-based resin, an epoxy-based resin, a polyester-based resin, a polyether-based resin, an acrylate-based resin, an acrylonitrile-butadiene-styrene resin (ABS), or rubber. For example, each of the first functional layer FL1 and the second functional layer FL2 may include at least one of phenylene, polyethylene terephthalate (PET), polyimide (PI), polyamide (PAI), polyethylene naphthalate (PEN), or polycarbonate (PC).

The protection layer PL may be disposed on the substrate PG. The protection layer PL may be provided on the first functional layer FL1. The protection layer PL may serve to protect the substrate PG from external shocks.

The protection layer PL may include a synthetic resin material. In an embodiment of the inventive concept, the protection layer PL may include at least one of, for example, a urethane-based resin, an epoxy-based resin, a polyester-based resin, a polyether-based resin, an acrylate-based resin, an acrylonitrile-butadiene-styrene resin (ABS), or a rubber. For example, the protection layer PL may include at least one of phenylene, polyethylene terephthalate (PET), polyimide (PI), polyamide (PAI), polyethylene naphthalate (PEN), or polycarbonate (PC).

The protection layer PL may have a single-layer structure or a multi-layer structure. For example, the protection layer PL may have a single-layer structure including a synthetic resin material, but is not limited thereto. For example, according to embodiments, the protection layer PL may be a multi-layer structure further including at least one of a hard coating layer, an anti-fingerprint layer, or an antifouling layer in addition to a layer including a synthetic resin material.

Figure 5:
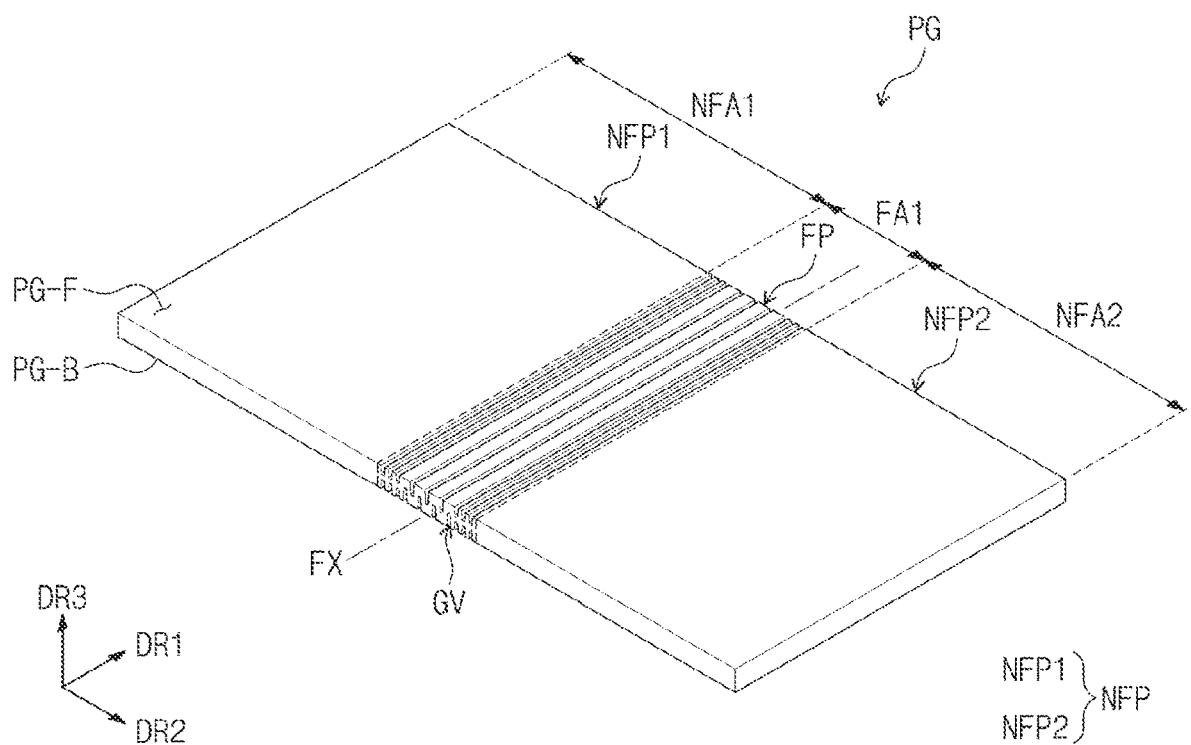
FIG. 5 is a perspective view of a window according to an embodiment of the inventive concept.

FIG. 5 is a perspective view of a substrate included in a window according to an embodiment of the inventive concept. The window including the substrate PG according to an embodiment, shown in FIG. 5 may be disposed on a display module and used in a display device, and those described in FIG. 4 may be equally applied.

Referring to FIG. 5, the substrate PG may be folded with respect to a virtual folding axis FX. The virtual folding axis FX may extend along the first direction DR1 substantially parallel to a short side of the window WM. The virtual folding axis FX shown in FIG. 5 may correspond to the first folding axis FX1 of FIG. 3. However, the inventive concept is not limited thereto. For example, according to embodiments, the substrate PG may be folded with respect to a folding axis extending in a direction substantially parallel to a long side of the substrate PG, that is, the second folding axis FX2 of FIG. 1. The shape of the foldable substrate PG may be varied according to embodiments.

The substrate PG includes a folding portion FP overlapping the folding area FA1 and non-folding portions NFP spaced apart in the second direction DR2 with the folding portion FP therebetween. The non-folding portion NFP includes a first non-folding portion NFP1 overlapping the first non-folding area NFA1, and a second non-folding portion NFP2 overlapping the second non-folding area NFA2. The folding portion FP may be a portion folded with a predetermined curvature with respect to the folding axis FX. The first non-folding portion NFP1 may be adjacent to one side of the folding portion FP along the second direction DR2, and the second non-folding portion NFP2 may be adjacent to the other side of the folding portion FP along the second direction DR2. The number of folding portions and non-folding portions included in the substrate PG is not limited what is shown in the figures.

The substrate PG may include an upper surface PG-F and a lower surface PG-B. The upper surface PG-F and the lower surface PG-B of the substrate PG may be substantially parallel to a plane defined by the first direction DR1 and the second direction DR2. The upper surface PG-F and the lower surface PG-B of the substrate PG may oppose each other.

The lower surface PG-B of the substrate PG may face the folding axis FX. The lower surface PG-B of the substrate PG may be placed closer to the folding axis FX in the third direction DR3 than the upper surface PG-F. The lower surface PG-B of the foldable substrate PG may be folded to surround the folding axis FX. However, the inventive concept is not limited thereto. For example, according to embodiments, the upper surface PG-F of the substrate PG may face the folding axis FX.

The substrate PG may include the upper surface PG-F and the lower surface PG-B extending in each of the first direction DR1 and the second direction DR2, and may have a rectangular parallelepiped shape in which a thickness thereof is defined along the third direction DR3. FIG. 5 shows, as an example, a substrate PG having right-angled corners. However, the inventive concept is not limited thereto. For example, according to embodiments, the substrate PG may have a rectangular parallelepiped shape with rounded corners corresponding to the shape of the window WM shown in FIG. 3.

The substrate PG may include an optically transparent material. For example, the substrate PG may include a glass substrate. In an embodiment, the substrate PG may include a chemically strengthened glass substrate. The window WM of an embodiment includes the substrate PG having a glass substrate, which may provide excellent aesthetics, and may prevent or reduce nicks or scratches caused by sharp materials.

The substrate PG may have a predetermined thickness along the third direction DR3. The thickness of the substrate PG may affect impact resistance of a window including the substrate PG. When the substrate PG is too thin, the window may be broken or damaged by shocks (e.g., shocks caused by a pen drop) concentrated on a local region. When the substrate PG is too thick, the substrate PG may have reduced flexibility or be broken upon folding. For example, the substrate PG may have a thickness of about 100 µm or greater. In an embodiment, the substrate PG may have a thickness of about 100 µm to about 1000 µm. However, the thickness of the substrate PG is not limited to the numerical examples above. When the thickness of the substrate PG satisfies the above ranges, impact resistance of the window including the substrate PG may be secured, and a display module disposed below the window may thus be protected.

A plurality of groove patterns GV may be defined on the substrate PG.

The plurality of groove patterns GV may be defined in the folding portion FP of the substrate PG. The plurality of groove patterns GV may be defined on each of the upper surface PG-F and the lower surface PG-B of the substrate PG. The plurality of groove patterns GV may be disposed to overlap the folding area FA1. In an embodiment, the plurality of groove patterns GV may non-overlap the first non-folding portion NFP1 and the second non-folding portion NFP2. For example, in an embodiment, the plurality of groove patterns GV are not disposed in the first non-folding portion NFP1 and the second non-folding portion NFP2. FIG. 5 shows, as an example, 19 groove patterns GV disposed in the folding portion FP. However, the number of the groove patterns GV is not limited thereto, and may be less or more than what is shown.

Each of the plurality of groove patterns GV may extend in one direction. For example, each of the plurality of groove patterns GV may extend in a direction in which the folding axis FX extends. FIGS. 4A and 4B show, as an example, a plurality of groove patterns GV each extending in the first direction DR1 substantially parallel to the folding axis FX. However, the inventive concept is not limited thereto. For example, according to embodiments, the plurality of groove patterns GV may extend obliquely to cross the direction in which the folding axis FX extends.

The plurality of groove patterns GV may be arranged along one direction crossing the folding axis FX. The plurality of groove patterns GV may be arranged to be spaced apart from each other with a portion of the upper surface PG-F and the lower surface PG-B of the substrate PG disposed therebetween. FIGS. 4A and 4B show, as an example, a plurality of groove patterns GV arranged to be spaced apart from each other along the second direction DR2.

With respect to one of the plurality of groove patterns GV, the groove patterns GV may extend from one end to the other end of the substrate PG. As shown in FIG. 5, each of the plurality of groove patterns GV may extend from one side surface of the substrate PG extending along the second direction DR2 to the other side surface of the window WM extending along the second direction DR2. However, the inventive concept is not limited thereto. For example, according to embodiments, at least some of the plurality of groove patterns GV may extend to be surrounded by any one of the upper surface PG-F and the lower surface PG-B of the substrate PG on a plane.

The plurality of groove patterns GV may be formed as some portions of the substrate PG are recessed from any one of the upper surface PG-F and the lower surface PG-B of the substrate PG towards the other surface. Each of the groove patterns GV may be recessed from the upper surface PG-F or the lower surface PG-B of the substrate PG, and may be defined as a side surface and a bottom surface that are connected to the upper surface PG-F or the lower surface PG-B of the substrate PG. Each of the groove patterns GV may include a bottom surface substantially parallel to the upper surface PG-F or the lower surface PG-B, and a side surface connecting the bottom surface with the upper surface PG-F or the lower surface PG-B of the substrate PG. The arrangement of the groove patterns GV will be described in further detail below.

Each of the plurality of groove patterns GV may have a lower width and an upper width. The lower width of the groove patterns GV may be a width of the bottom surface of the groove patterns GV, and the upper width may be the distance between the upper surface PG-F of the substrate PG and the side surfaces of the groove patterns GV. The groove patterns GV may have an upper width greater than a lower width. Hereinafter, as used herein, "a width of a groove pattern" indicates an upper side width of the groove pattern GV. The width of the groove patterns GV may be defined along the second direction DR2 crossing a direction in which the groove patterns GV extend. The groove patterns GV may have a width of about 20 μm to about 300 μm.

When the plurality of groove patterns GV are disposed in the folding area FA1, the folding characteristic of the substrate PG may be improved. For example, a portion of the substrate PG overlapping the folding area FA1 by the plurality of groove patterns GV may become relatively thinner, and the substrate PG may have greater flexibility. When folded, the folding area FA1 of the substrate PG may be bent with a predetermined curvature, and compressive or tensile stress may be applied into the substrate PG when overlapping the folding area FA1. The plurality of groove patterns GV may reduce compressive or tensile stress applied into the substrate PG, which may prevent or reduce damage due to folding of the substrate PG.

FIGS. 6A to 6E are cross-sectional views showing a portion of a cross-section of a substrate included in a window according to an embodiment of the inventive concept. FIGS. 6A to 6E mainly show the shape and arrangement of the plurality of groove patterns formed in the folding portion FP.

Referring to FIGS. 4, 5, and 6A to 6C together, the substrate PG according to an embodiment includes a folding portion FP and a non-folding portion NFP arranged along the second direction DR2, and the folding portion FP includes a center portion FP-C disposed adjacent to the folding axis FX and first and second outer portions FP-S1 and FP-S2 spaced apart from the folding axis FX as compared to the center portion FP-C. The first and second outer portions FP-S1 and FP-S2 may be disposed between the folding portion FP and the non-folding portion NFP. The first outer portion FP-S1 and the second outer portion FP-S2 are spaced apart from each other with the center portion FP-C disposed therebetween. In the folding area FA1 shown in FIG. 5, a portion where the center portion FP-C overlaps may be referred to as a center area FA-C, and a portion where the first and second outer portions FP-S1 and FP-S2 overlap may be referred to as first and second outer areas FA-S1 and FA-S2, respectively. For example, according to embodiments, the center portion FP-C is disposed in the center area FA-C and not in the first and second outer areas FA-S1 and FA-S2, and the first and second outer portions FP-S1 and FP-S2 are disposed in the first and second outer area FA-S1 and FA-S2, respectively, and are not disposed in the center area FA-C.

According to embodiments, an overall width of the center portion FP-C in the second direction DR2 may be substantially equal to an overall width of the first and second outer portions FP-S1 and FP-S2 in the second direction DR2. That is, the width of the center portion FP-C in the second direction DR2 may be substantially equal to the sum of the widths of each of the first and second outer portions FP-S1 and FP-S2 in the second direction DR2. However, the inventive concept is not limited thereto. For example, according to embodiments, an overall width of the center portion FP-C in the second direction DR2 may be different from an overall width of the first and second outer portions FP-S1 and FP-S2 in the second direction DR2. As used herein, "substantially equal" in width and length includes not only a case in which width and length are physically the same, but also a case in which numerical values are different by a difference that may be generated in a process despite the same design.

The center portion FP-C and the first and second outer portions FP-S1 and FP-S2 may include a plurality of different groove patterns. That is, groove patterns defined in the center portion FP-C and groove patterns defined in the first and second outer portions FP-S1 and FP-S2 may be different in at least one of a cross-sectional shape or an arrangement. The plurality of groove patterns GV may include first groove patterns GU-C and GB-C defined in the center portion FP-C and second groove patterns GU-S1, GU-S2, GB-S1, and GB-S2 defined in the first and second outer portions FP-S1 and FP-S2. The first groove patterns GU-C and GB-C defined in the center portion FP-C may be provided in a plurality. The second groove patterns GU-S1, GU-S2, GB-S1, and GB-S2 defined in the first and second outer portions FP-S1 and FP-S2 may be provided in a plurality. The first groove patterns GU-C and GB-C and the second groove patterns GU-S1, GU-S2, GB-S1, and GB-S2 may be different in at least one of a cross-sectional shape or an arrangement. The second groove patterns GU-S1, GU-S2, GB-S1, and GB-S2 may include 2-1 groove patterns GU-S1 and GB-S1 provided in the first outer portion FP-S1 and 2-2 groove patterns GU-S2 and GB-S2 provided in the second outer portion FP-S2.

According to embodiments, the plurality of groove patterns GV provided in the folding portion FP may be symmetrical with respect to the folding axis FX. As shown in FIGS. 6A to 6E, the plurality of groove patterns GV provided in the folding portion FP may be provided to be symmetrical with respect to a virtual center line passing through the folding axis FX and substantially perpendicular to the substrate PG. The first groove patterns GU-C and GB-C defined in the center portion FP-C may be provided to be symmetrical with respect to a virtual center line passing through the folding axis FX. The 2-1 groove patterns GU-S1 and GB-S1 provided in the first outer portion FP-S1 and the 2-2 groove patterns GU-S2 and GB-S2 provided in the second outer portion FP-S2 are symmetrical with respect to the virtual center line passing through the folding axis FX, and the 2-1 groove patterns GU-S1 and GB-S1 and the 2-2 groove patterns GU-S2 and GB-S2 may thus have a mirror-image relationship.

The plurality of groove patterns GV may include an upper groove pattern GU having a shape recessed from the upper surface PG-F and a lower groove pattern GB having a shape recessed from the lower surface PG-B. The upper groove patterns GU may be patterns recessed by a predetermined depth from the upper surface PG-F towards the lower surface PG-B of the substrate PG, and the lower groove patterns GB may be patterns recessed by a predetermined depth from the lower surface PG-B towards the upper surface PG-F of the substrate PG.

The upper groove patterns GU may include a first upper groove pattern GU-C defined in the center portion FP-C, and second upper groove patterns GU-S1 and GU-S2 defined in the first and second outer portions FP-S1 and FP-S2. The lower groove patterns GB may include a first lower groove pattern GB-C defined in the center portion FP-C, and second lower groove patterns GB-S1 and GB-S2 defined in the first and second outer portions FP-S1 and FP-S2. Each of the second upper groove patterns GU-S1 and GU-S2 and the second lower groove patterns GB-S1 and GB-S2 may be defined in each of the first outer portion FP-S1 and the second outer portion FP-S2.

In the substrate PG included in the window WM according to an embodiment, the first upper groove pattern GU-C and the first lower groove pattern GB-C defined in the center portion FP-C may partially overlap in the second direction DR2. Each of the first upper groove pattern GU-C and the first lower groove pattern GB-C may be provided in a plurality, and a plurality of first upper groove patterns GU-C and a plurality of first lower groove patterns GB-C may partially overlap in the second direction DR2. Each of the plurality of first upper groove patterns GU-C may partially overlap the first lower groove pattern GB-C defined closest among the plurality of groove patterns GB-C with respect to the second direction DR2. As used herein, the reference of a configuration "defined closest" indicates one that is defined closest with respect to the second direction DR2.

According to embodiments, in the center area FA-C, the first upper groove pattern GU-C and the first lower groove pattern GB-C are provided so as not to overlap each other in the third direction DR3, which is a thickness direction of the substrate PG. That is, the plurality of first upper groove patterns GU-C and the plurality of first lower groove patterns GB-C may be alternately provided with respect to the second direction DR2 such that they do not overlap each other in the third direction DR3. That is, the plurality of groove patterns provided in the center portion FP-C according to an embodiment may have an arrangement in which one of the plurality of first lower groove patterns GB-C is provided respectively between the plurality of first upper groove patterns GU-C with respect to the second direction DR2. Herein, as in the arrangement form of the plurality of first upper groove patterns GU-C and the plurality of first lower groove patterns GB-C, an arrangement in which the plurality of first upper groove patterns GU-C and the plurality of first lower groove patterns GB-C partially overlap in the second direction DR2 and are alternately provided along the second direction DR2 such that they do not overlap in the third direction DR3 may be referred to as a zigzag arrangement.

In the substrate PG included in the window WM according to an embodiment, the second upper groove patterns GU-S1 and GU-S2 and the second lower groove patterns GB-S1 and GB-S2 defined in the first and second outer portions FP-S1 and FP-S2 may be provided so as not to overlap in the second direction DR2. Each of the second upper groove patterns GU-S1 and GU-S2 and the second lower groove patterns GB-S1 and GB-S2 may be provided in a plurality, and according to embodiments, each of the plurality of second upper groove patterns GU-S1 and GU-S2 and the plurality of second lower groove patterns GB-S1 and GB-S2 does not overlap in the second direction DR2. According to embodiments, each of the plurality of second upper groove patterns GU-S1 and GU-S2 does not overlap the second lower groove pattern GB-S1 and GB-S2 defined closest among the plurality of groove patterns GB-S1 and GB-S2 with respect to the second direction DR2. As shown in FIG. 6A, when each of the plurality of second upper groove patterns GU-S1 and GU-S2 is arranged side by side with the corresponding second lower groove patterns GB-S1 and GB-S2 in the second direction DR2, the pattern "defined closest" indicates a pattern that overlaps in the third direction DR3. According to embodiments, the second upper groove pattern GU-S1 and the second lower groove pattern GB-S1 provided in the first outer portion FP-S1 do not overlap in the second direction DR2, and the second upper groove pattern GU-S2 and the second lower groove pattern GB-S2 provided in the second outer portion FP-S2 do not overlap in the second direction DR2.

As shown in FIG. 6A, the second upper groove patterns GU-S1 and GU-S2 and the second lower groove patterns GB-S1 and GB-S2 may overlap in the third direction DR3, that is, a thickness direction of the substrate PG. Each of the plurality of second upper groove patterns GU-S1 and GU-S2 may be provided to overlap any corresponding one of the plurality of second lower groove patterns GB-S1 and GB-S2 in the third direction DR3. FIG. 6A shows, as an example, an arrangement in which all of the plurality of second upper groove patterns GU-S1 and GU-S2 and the plurality of second lower groove patterns GB-S1 and GB-S2 overlap in the third direction DR3 in a one-to-one correspondence. However, the inventive concept is not limited thereto. For example, according to embodiments, some of the plurality of second upper groove patterns GU-S1 and GU-S2 and the plurality of second lower groove patterns GB-S1 and GB-S2 may not overlap in the third direction DR3.

The sum of a depth d1 of the first upper groove pattern GU-C defined in the center portion FP-C and a depth d2 of the first lower groove pattern GB-C may be greater than a total thickness T1 of the substrate PG. Accordingly, the first upper groove pattern GU-C and the first lower groove pattern GB-C may be provided to partially overlap in the second direction DR2. In FIGS. 6A to 6E, as an example, the depth d1 of the first upper groove pattern GU-C and the depth d2 of the first lower groove pattern GB-C are shown to be the same, but the inventive concept is not limited thereto. For example, according to embodiments, the depth d1 of the first upper groove pattern GU-C and the depth d2 of the first lower groove pattern GB-C may be different. As shown in FIGS. 6A to 6E, each of the depth d1 of the first upper groove pattern GU-C and the depth d2 of the first lower groove pattern GB-C may be at least half of the total thickness T1 of the substrate PG. However, the inventive concept is not limited thereto, and any one of the depth d1 of the first upper groove pattern GU-C and the depth d2 of the first lower groove pattern GB-C may be less than half of the total thickness T1 of the substrate PG according to embodiments. For example, in an embodiment, the depth d2 of the first lower groove pattern GB-C may be about 40% or less of the total thickness T1 of the substrate PG, and the depth d1 of the first upper groove pattern GU-C may be about 60% or greater of the total thickness T1 of the substrate PG.

The sum of a depth d3 of the second upper groove pattern GU-S1 and GU-S2 defined in the first and second outer portions FP-S1 and FP-S2 and a depth d4 of the second lower groove patterns GB-S1 and GB-S2 may be less than the total thickness T1 of the substrate PG. Accordingly, in embodiments, the second upper groove patterns GU-S1 and GU-S2 and the second lower groove patterns GB-S1 and GB-S2 are provided so as not to overlap in the second direction DR2. As shown in FIG. 6A, the depth d3 of the second upper groove patterns GU-S1 and GU-S2 and the depth d4 of the second lower groove patterns GB-S1 and GB-S2 may be substantially the same.

Figure 6B:
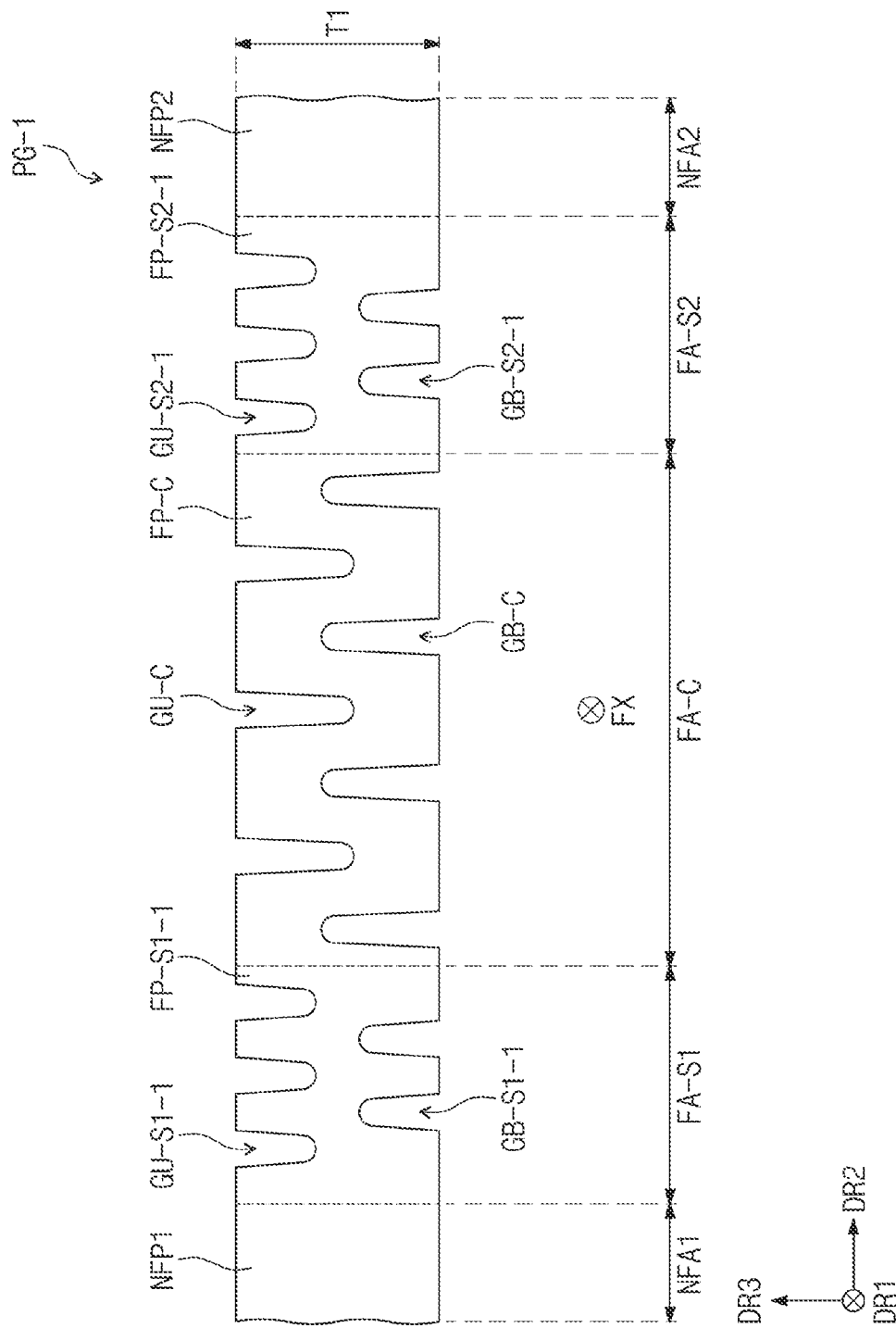

As shown in FIG. 6B, in a substrate PG-1 according to an embodiment, second upper groove patterns GU-S1-1 and GU-S2-1 and second lower groove patterns GB-S1-1 and GB-S2-1 defined in first and second outer portions FP-S1-1 and FP-S2-1 are provided so as not to overlap in the third direction DR3, that is, a thickness direction of the substrate PG-1. Each of the plurality of second upper groove patterns GU-S1-1 and GU-S2-1 are provided so as not to overlap each of the plurality of second lower groove patterns GB-S1-1 and GB-S2-1 in the third direction DR3 to be alternately arranged along the second direction DR2. That is, as shown in FIG. 6B, the substrate PG-1 according to an embodiment may have an arrangement in which one of the plurality of second lower groove patterns GB-S1-1 and GB-S2-1 is provided respectively between the plurality of second upper groove patterns GU-S1-1 and GU-S2-1 with respect to the second direction DR2.

Figure 6C:
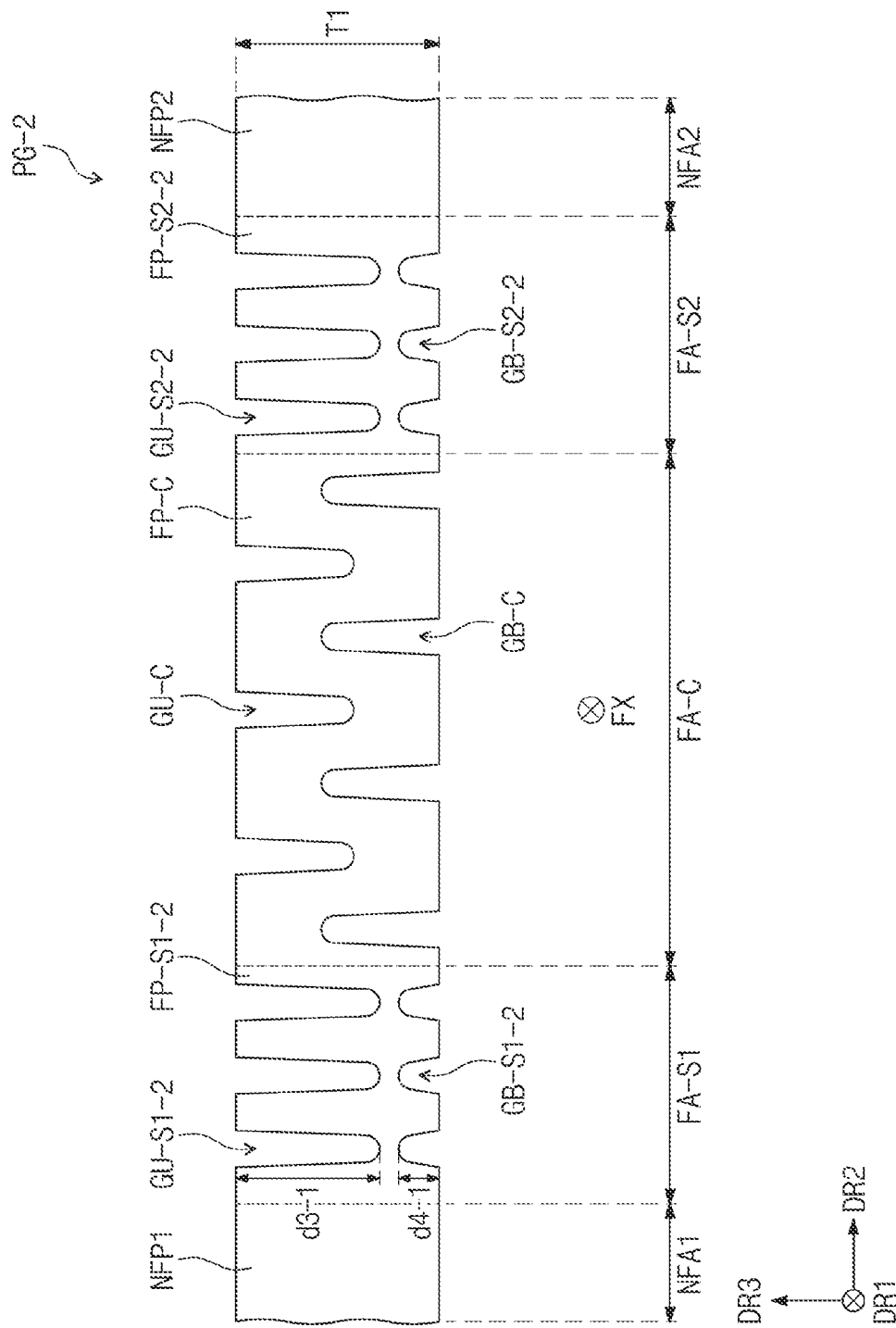

As shown in FIG. 6C, in a substrate PG-2 according to an embodiment, second upper groove patterns GU-S1-2 and GU-S2-2 defined in the first and second outer portions FP-S1-2 and FP-S2-2 has a depth d3-1 which is different from a depth d4-1 of second lower groove patterns GB-S1-2 and GB-S2-2. In an embodiment, a value of the depth d3-1 of the second upper groove patterns GU-S1-2 and GU-S2-2 may be greater than a value of the depth d4-1 of the second lower groove pattern GB-S1-2 and GB-S2-2. In the substrate PG-2 according to an embodiment, the folding axis FX is defined adjacent to the lower surface PG-B of the substrate PG-2 (FIG. 5), and the second upper groove patterns GU-S1-2 and GU-S2-2 defined on the upper surface PG-F (FIG. 5) spaced apart from the folding axis FX may thus be formed deeper than the second lower groove patterns GB-S1-2 and GB-S2-2 defined on the lower surface PG-B (FIG. 5) adjacent to the folding axis FX. Accordingly, stress applied to the substrate PG-2 according to the folding operation may be effectively reduced.

Figure 6D:
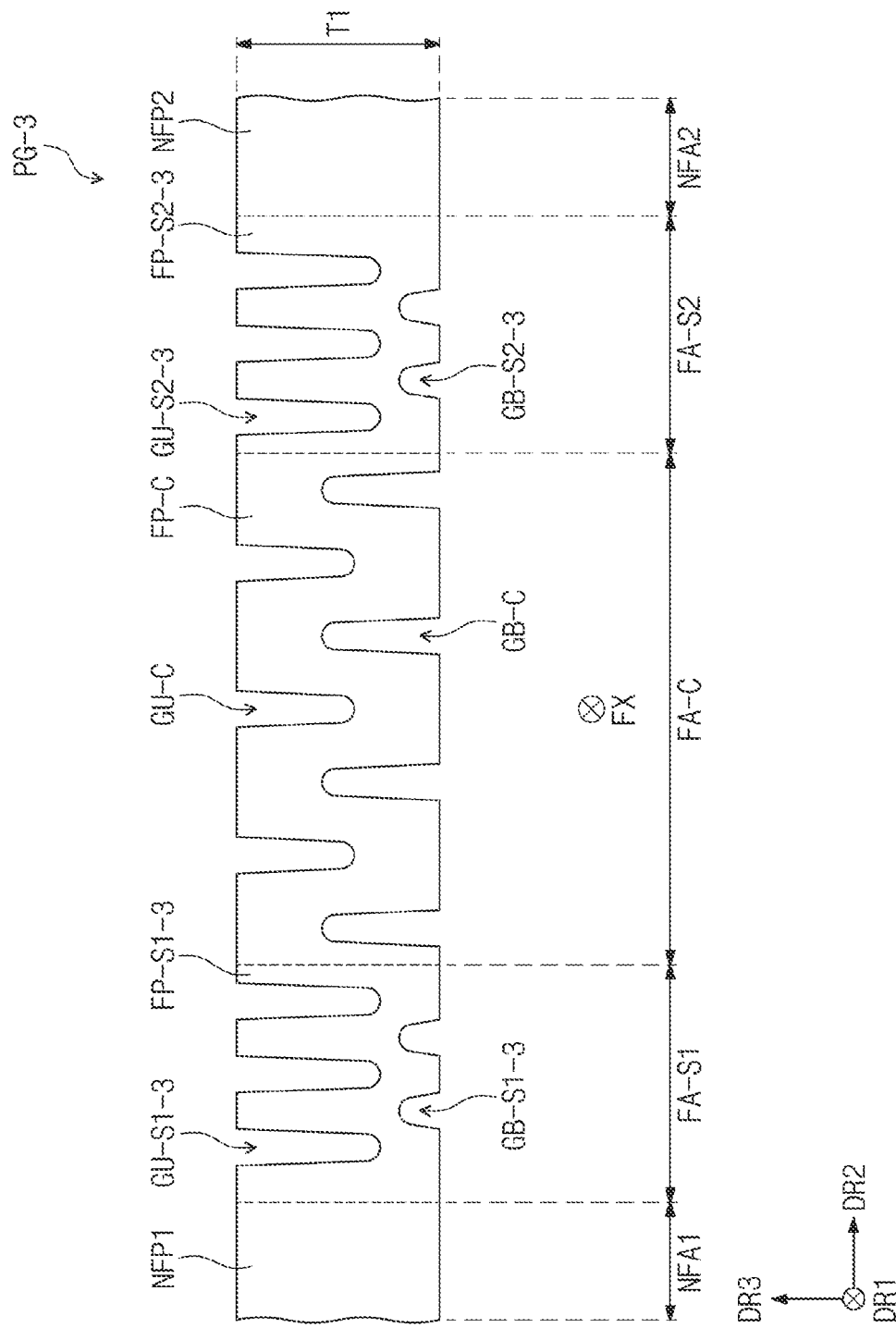

As shown in FIG. 6C, the second upper groove patterns GU-S1-2 and GU-S2-2 and the second lower groove patterns GB-S1-2 and GB-S2-2 may be provided to overlap in the third direction DR3, that is, a thickness direction of the substrate PG-2. Each of the plurality of second upper groove patterns GU-S1-2 and GU-S2-2 may be provided to overlap any corresponding one of the plurality of second lower groove patterns GB-S1-2 and GB-S2-2 in the third direction DR3. As shown in FIG. 6C, both of the plurality of second upper groove patterns GU-S1-2 and GU-S2-2 and the second lower groove patterns GB-S1-2 and GB-S2-2 may be arranged in a one-to-one correspondence to overlap in the third direction DR3. However, the inventive concept is not limited thereto. For example, as shown in FIG. 6D, in a substrate PG-3 according to an embodiment, while second upper groove patterns GU-S1-3 and GU-S2-3 defined in first and second outer portions FP-S1-3 and FP-S2-3 may be provided to be deeper in depth than second lower groove patterns GB-S1-3 and GB-S2-3, the second upper groove patterns GU-S1-3 and GU-S2-3 and the second lower groove patterns GB-S1-3 and GB-S2-3 are provided so as not to overlap in the third direction DR3, that is, a thickness direction. That is, as shown in FIG. 6D, the substrate PG-3 according to an embodiment may have an arrangement in which one of the plurality of second lower groove patterns GB-S1-3 and GB-S2-3 is provided respectively between the plurality of second upper groove patterns GU-S1-3 and GU-S2-3 with respect to the second direction DR2.

Figure 6E:
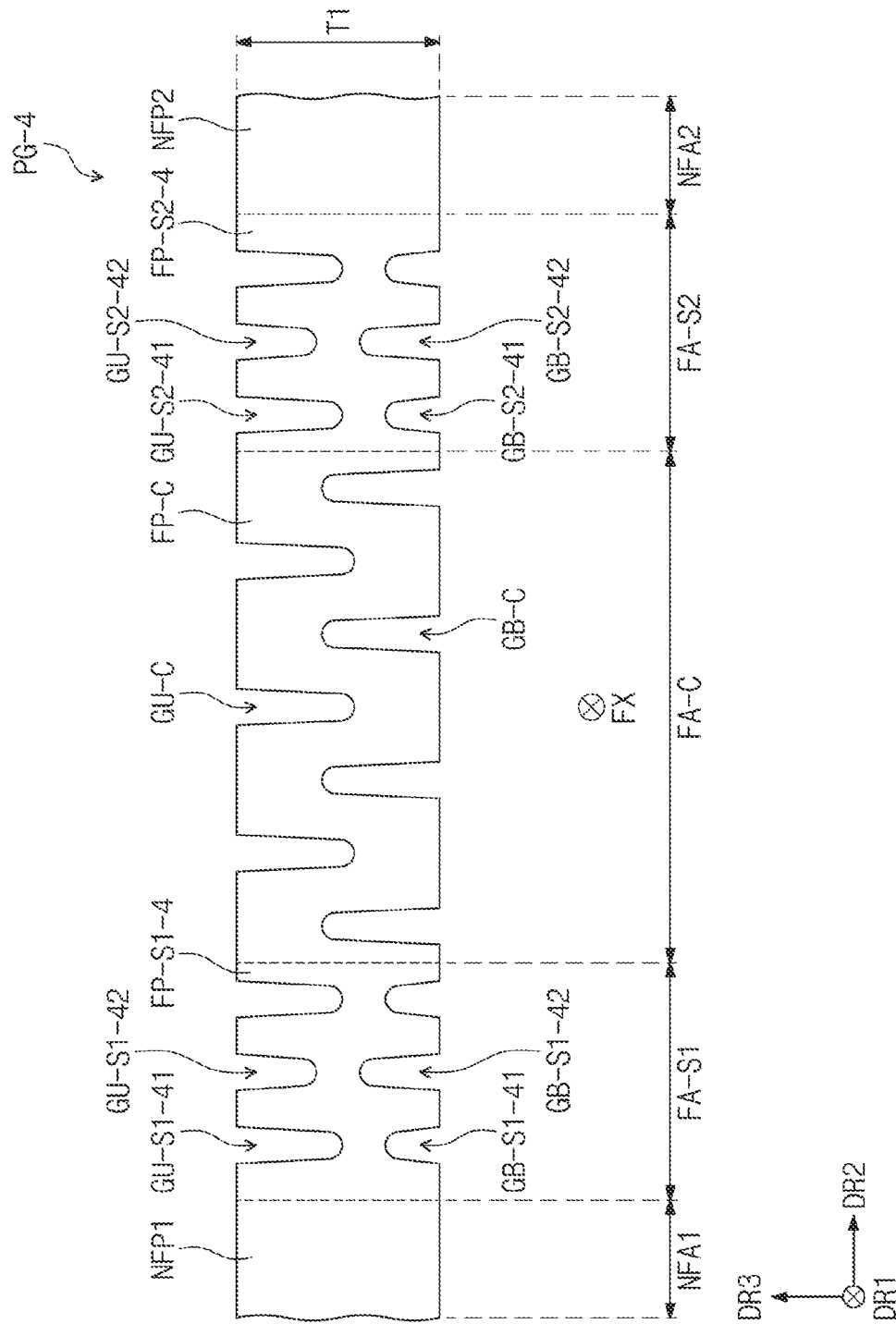

In FIG. 6A, the plurality of second upper groove patterns GU-S1 and GU-S2 are shown to have the same depth, but the inventive concept is not limited thereto. For example, according to embodiments, any one of the plurality of second upper groove patterns GU-S1 and GU-S2 may have a different depth from other patterns. For example, as shown in FIG. 6E, in a substrate PG-4 of an embodiment, the depths of two adjacently disposed patterns among a plurality of second upper groove patterns GU-S1-41, GU-S1-42, GU-S2-41, and GU-S2-42 may be different from each other. For example, the 2-1 upper groove pattern GU-S1-41 and the 2-2 upper groove pattern GU-S1-42 which are disposed adjacent among the plurality of second upper groove patterns GU-S1-41 and GU-S1-42 provided in a first outer portion FP-S1-4 may have different depths. The 2-3 upper groove pattern GU-S2-41 and the 2-4 upper groove pattern GU-S2-42 which are disposed adjacent among the plurality of second upper groove patterns GU-S2-41 and GU-S2-42 provided in a second outer portion FP-S2-4 may have different depths.

Similarly, in FIG. 6A, the plurality of second lower groove patterns GB-S1 and GB-S2 are shown to have the same depth, but the inventive concept is not limited thereto. For example, according to embodiments, any one of the plurality of second lower groove patterns GB-S1 and GB-S2 may have a different depth from other patterns. For example, as shown in FIG. 6E, in a substrate PG-4 of an embodiment, the depths of two adjacently disposed patterns among a plurality of second lower groove patterns GB-S1-41, GB-S1-42, GB-S2-41, and GB-S2-42 may be different from each other. For example, the 2-1 lower groove pattern GB-S1-41 and the 2-2 lower groove pattern GB-S1-42 which are disposed adjacent among the plurality of second lower groove patterns GB-S1-41 and GB-S1-42 provided in a first outer portion FP-S1-4 may have different depths. The 2-3 lower groove pattern GB-S2-41 and the 2-4 lower groove pattern GB-S2-42 which are disposed adjacent among the plurality of second lower groove patterns GB-S2-41 and GB-S2-42 provided in a second outer portion FP-S2-4 may have different depths.

Figure 7A:
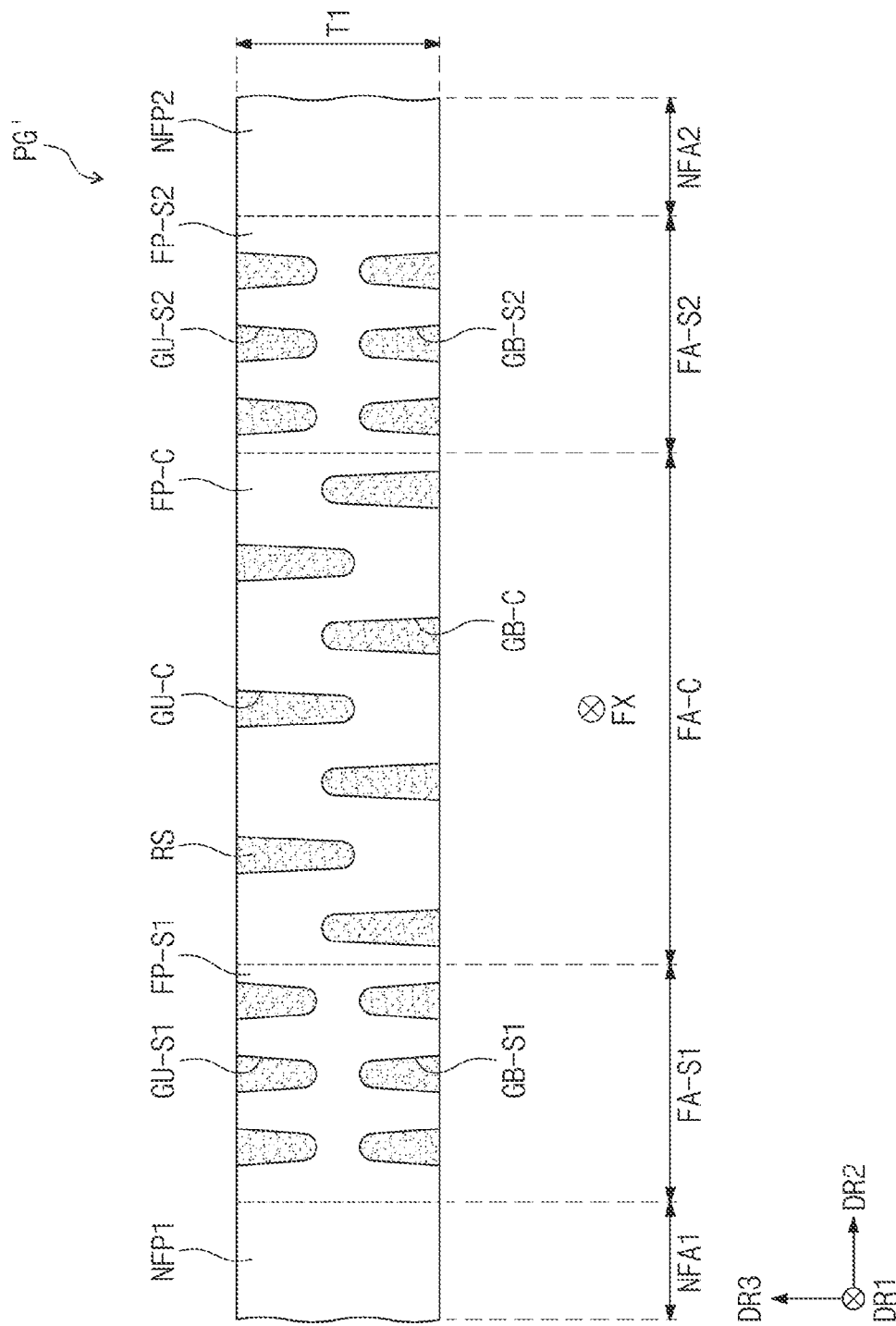
FIG. 7A is a cross-sectional view showing a substrate included in a window according to an embodiment of the inventive concept.
Figure 7B:
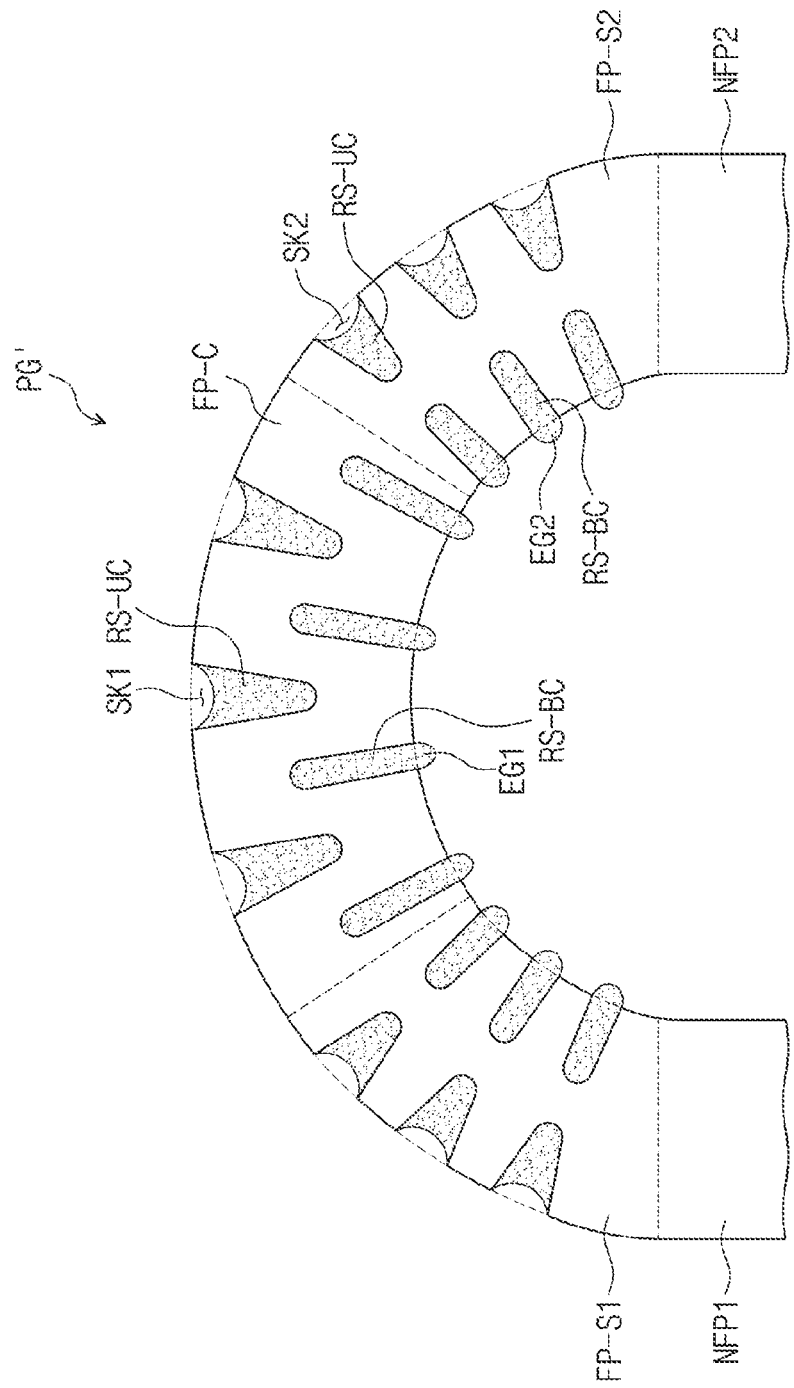
FIG. 7B is a cross-sectional view showing a folded state of a substrate included in a window according to an embodiment of the inventive concept.

FIG. 7A is a cross-sectional view showing a portion of a cross-section of a substrate included in a window according to an embodiment of the inventive concept. FIG. 7B is a cross-sectional view showing a folded state of a substrate included in a window according to an embodiment of the inventive concept. FIG. 7A shows a cross-section in which a substrate PG according to an embodiment shown in FIG. 6A includes an additional configuration, and FIG. 7B shows a cross-section in which a substrate PG is folded with respect to a cross-section of the substrate PG according to an embodiment shown in FIG. 7A. FIGS. 7A and 7B show and describe, as an example, that the substrate PG of an embodiment shown in FIG. 6A includes an additional configuration, but descriptions thereof may be equally applied to the substrates PG-1, PG-2, PG-3, and PG-4 shown in FIGS. 6B to 6E.

Referring to FIGS. 6A and 7A, a filling member RS may be disposed in a plurality of groove patterns GV defined in the substrate PG' according to an embodiment. The filling member RS may be provided to contact the bottom and side surfaces of the groove patterns GV and completely fill the inside of the groove patterns GV. The shape of the filling member RS may correspond to the shape of the plurality of groove patterns GV. The filling member RS may absorb external shocks by filling inner spaces formed by the groove patterns GV, and may support impact resistance in the folding area FA1 of the window WM. The filling member RS may be provided in both the upper groove patterns GU and the lower groove patterns GB. The filling member RS may be provided in both the first groove patterns GU-C and GB-C defined in the center portion FP-C and the second groove patterns GU-S1, GU-S2, GB-S1, and GB-S2 defined in the outer portions FP-S1 and FP-S2.

The filling member RS may include an elastic material. The filling member RS may include an organic material. For example, the filling member RS may include a resin having an elastic force. The filling member RS may prevent or reduce the occurrence of the window WM being deformed due to compressive or tensile stress applied upon folding, and may maintain the improved folding characteristics of the window WM.

The filling member RS may include an optically transparent material. Accordingly, users may view images provided through the display surface IS (FIG. 3) overlapping the folding areas FA-C, FA-S1, and FA-S2 of the window WM.

The filling member RS may include the same material as the adhesive layer AD (FIG. 3) or the functional layer FL1 and FL2 (FIG. 4), which are described above. The filling member RS may be formed as a single body with the adhesive layer AD (FIG. 3) or the functional layer FL1 and FL2 (FIG. 4). However, the inventive concept is not limited thereto. For example, according to embodiments, the filling member RS may include different materials from the adhesive layer AD (FIG. 3) or the functional layer FL1 and FL2 (FIG. 4).

Referring to FIGS. 6A, 7A, and 7B together, when a window WM-1 of an embodiment is folded with respect to the folding axis FX, compressive or tensile stress may be applied to the filling member RS disposed in the plurality of groove patterns GV. For example, an upper filling member RS-UC disposed in the upper groove pattern GU among the filling members RS disposed in the plurality of groove patterns GV may have some recessions SK1 and SK2 when folded with respect to the folding axis FX due to tensile stress, and a lower filling member RS-BC disposed in the lower groove pattern GB may have some protrusions EG1 and EG2 when folded with respect to the folding axis FX due to compressive stress.

In the substrate PG of an embodiment, the extent of recession or protrusion of the filling member RS disposed in each of the center portion FP-C and the outer portions FP-S1 and FP-S2 may be different upon folding due to modification in the cross-sectional shape and arrangement of groove patterns provided to each of the center portion FP-C and the first and second outer portions FP-S1 and FP-S2. For example, as described above, the first upper groove pattern GU-C and the first lower groove pattern GB-C defined in the center portion FP-C may be provided to overlap in part in the second direction DR2, and the second upper groove patterns GU-S1 and GU-S2 and the second lower groove patterns GB-S1 and GB-S2 defined in the outer portions FP-S1 and FP-S2 may be provided so as not to overlap in the second direction DR2. Accordingly, the extent of the recession SK2 of a filling member in the upper filling member RS-UC provided in the outer portion FP-S1 and FP-S2 may be smaller than the extent of the recession SK1 of a filling member in the upper filling member RS-UC provided in the center portion FP-C among the upper filling members RS-UC. In addition, the extent of the protrusion EG2 of a filling member in the lower filling member RS-BC provided in the outer portion FP-S1 and FP-S2 may be smaller than the extent of the protrusion EG1 of a filling member in the lower filling member RS-BC provided in the center portion FP-C among the lower filling members RS-BC.

The substrate included in the window according to an embodiment of the inventive concept may include the center portion FP-C and the first and second outer portions FP-S1 and FP-S2 that are divided with respect to their distance from the folding axis FX in the folding portion FP. In addition, in the center portion FP-C, the plurality of groove patterns may have a zigzag arrangement as shown in FIGS. 6A to 6E, and in the first and second outer portions FP-S1 and FP-S2, the plurality of groove patterns may have an arrangement different from the zigzag arrangement. In the substrate included in the window according to an embodiment, the plurality of groove patterns provided in the first and second outer portions FP-S1 and FP-S2 may have an arrangement in which the upper groove patterns and the lower groove patterns do not overlap in a groove pattern arrangement direction.

When the groove patterns are provided in the above-described zigzag arrangement, the folding axis may be tilted from a vertical direction to a diagonal direction with respect to a substrate, thereby reducing stress applied to the substrate upon folding. However, the groove patterns upon folding may have greater deformation to cause greater deformation of a filling member disposed in the groove patterns. As a result, the filling member may be damaged or separated upon folding. In addition, when groove patterns are provided in the form of a zigzag arrangement throughout the entire folding portion, the device may be vulnerable to external shocks. For example, the substrate may be damaged due to external shocks at a boundary portion between the folding portion and the non-folding portion having relatively weak impact resistance.

In the substrate included in the window according to embodiments of the inventive concept, in a center portion adjacent to the folding axis, a plurality of groove patterns are provided in the form of a zigzag arrangement to reduce folding stress. In contrast, at the boundary between the folding portion and the non-folding portion, that is, at an outer portion, which is relatively vulnerable to external shocks compared to the center portion, a plurality of groove patterns are provided in the form of an arrangement in which upper groove patterns and lower groove patterns do not overlap in the groove pattern arrangement direction (e.g., the zigzag arrangement is not utilized). Thus, impact resistance of the substrate may be increased and the damage or separation of the filling member may be prevented or reduced. Accordingly, the window including the substrate according to an embodiment of the inventive concept may provide a window having increased durability by reducing stress applied upon folding, and by preventing or reducing the occurrence of damage to the window due to folding.

Figure 8:
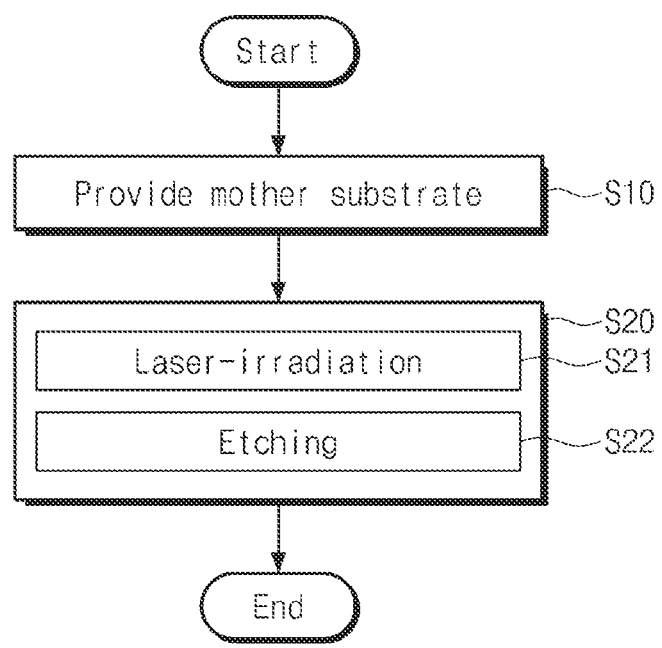
FIG. 8 shows a flowchart of a method of manufacturing a window according to an embodiment of the inventive concept.

FIG. 8 is a flowchart showing a method of manufacturing a window according to an embodiment.

Referring to FIG. 8, the method of manufacturing a window may include providing a mother substrate (S10) and forming a groove (S20).

The mother substrate provided in operation S10 is a substrate for manufacturing a window, and may correspond to a substrate before grooves are formed. The mother substrate provided in operation S10 may be, for example, a glass substrate before being strengthened, but is not limited thereto. For example, in an embodiment, the mother substrate may be a tempered glass substrate that has been strengthened according to a manufacturing process. Virtual lines defined in a direction in which grooves extend may be defined in the mother substrate to form the grooves.

Thereafter, the forming of grooves on the mother substrate (S20) may be performed. The forming of grooves (S20) may include laser-irradiating (S21) and etching (S22).

The laser emitted in the laser-irradiating (S21) may overlap irradiation points to change the refractive index of a portion of the mother substrate. The portion of the laser-irradiated mother substrate may be deformed by the laser, and the refractive index of the laser-irradiated points and the refractive index of the mother substrate which is not laser-irradiated may be different.

The etching (S22) may include wet-etching that provides an etching solution on the laser-irradiated points. Methods of providing the etching solution include, for example, a spray method in which the etching solution is sprayed on the laser-irradiated parent substrate points, or a dipping method in which the parent substrate is immersed in the etching solution, but is not limited thereto. The etching solution provided in an embodiment of the inventive concept may include an alkali solution.

Figure 9A:
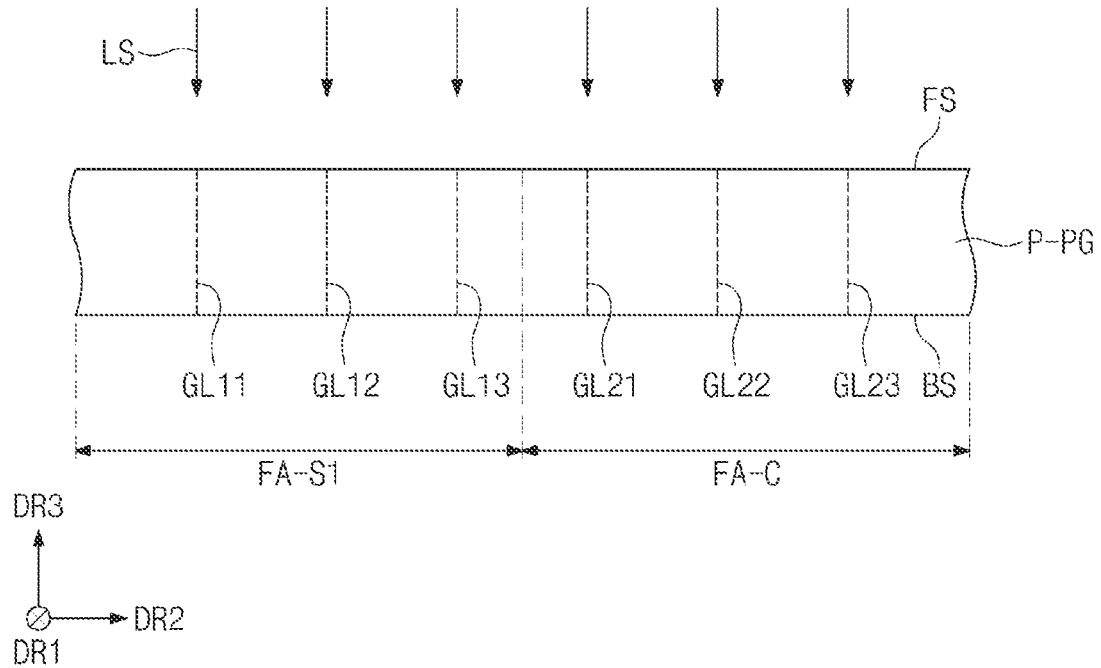
FIGS. 9A to 9C show each process of a method of manufacturing a window according to an embodiment of the inventive concept.
Figure 9B:
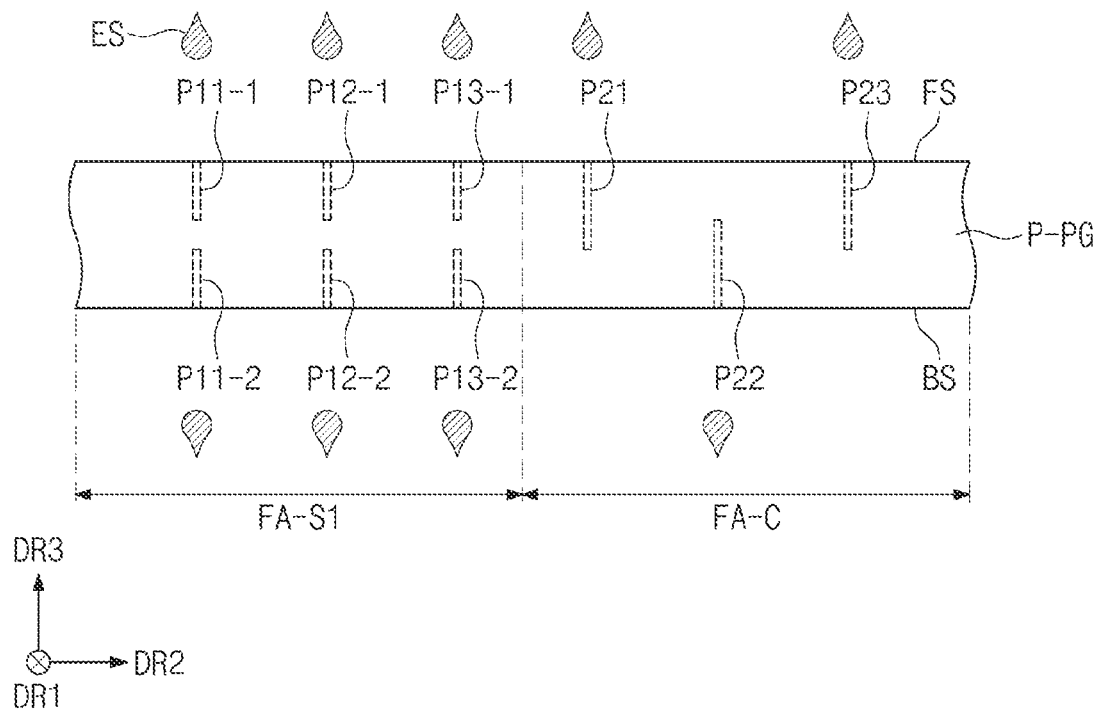
Figure 9C:
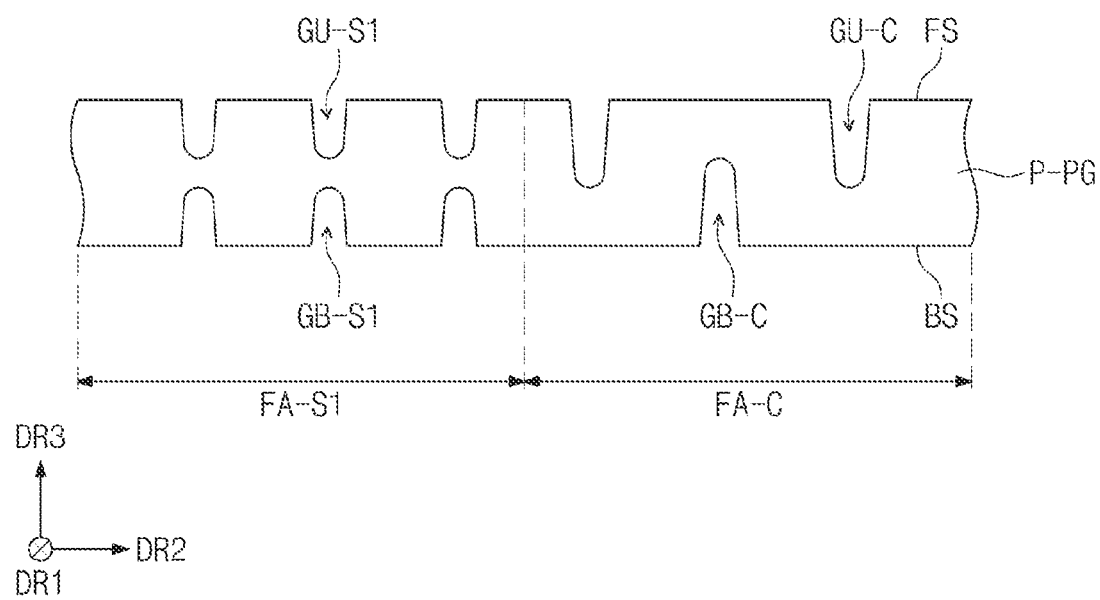

FIGS. 9A to 9C are cross-sectional views showing a process of a method of manufacturing a window according to an embodiment. Hereinafter, each process of the method of manufacturing a window according to an embodiment of the inventive concept will be described in detail with reference to FIGS. 9A to 9C.

Referring to FIG. 9A, a parent substrate P-PG may include an upper surface FS and a lower surface BS, and may have a thickness in the third direction DR3. Virtual lines GL11, GL12, GL13, GL21, GL22, and GL23 for forming grooves may be defined in an outer area FA-S1 and a center area FA-C of the mother substrate P-PG. The lines GL11, GL12, GL13, GL21, GL22, and GL23 may correspond to sites where the grooves are to be formed in a process to be described later, and may be defined in the same direction in which the grooves extend.

For convenience of description, FIG. 9A shows, as an example, three lines GL11, GL12, GL13, GL21, GL22, and GL23 defined in each of the outer area FA-S1 and the center area FA-C. The lines GL11, GL12, GL13, GL21, GL22, and GL23 may be defined in the third direction DR3 (e.g., the same direction in which the grooves to be formed extend). Hereinafter, the lines GL11, GL12, GL13, GL21, GL22, and GL23 are referred to as first lines GL11, GL12, and GL13 and second lines GL21, GL22, and GL23. The first lines GL11, GL12, and GL13 may be lines defined in the outer area FA-S1, and the second lines GL21, GL22, and GL23 may be lines defined in the center area FA-C.

Laser LS may be emitted from the upper surface FS or the lower surface BS of the mother substrate P-PG towards a thickness direction of the mother substrate P-PG. The laser LS may be emitted to the mother substrate P-PG in the third direction DR3. The laser LS may be emitted to overlap the lines GL11, GL12, GL13, GL21, GL22, and GL23. For example, the laser LS may be emitted to overlap the first lines GL11, GL12, and GL13 on the upper surface FS or the lower surface BS of the mother substrate P-PG. The laser LS may be emitted to overlap the second lines GL21, GL22, and GL23 on the upper surface FS or the lower surface BS of the mother substrate P-PG.

The first lines GL11, GL12, and GL13 and the second lines GL21, GL22, and GL23 each may be provided in a plurality of rows. However, the inventive concept is not limited thereto. For example, according to embodiment, the first lines GL11, GL12, and GL13 are provided in one row, and the second lines GL21, GL22, and GL23 are provided in a plurality of rows, so that a width of grooves to be formed at the positions where the first lines GL11, GL12, and GL13 are defined may be adjusted to be smaller than a width of grooves to be formed at the positions where the second lines GL21, GL22, and GL23 are defined.

As local melting takes place at the points of the mother substrate P-PG to which the laser LS is emitted, a phase may be changed, and accordingly, a refractive index may be changed. The refractive index of the points of the parent substrate P-PG to which the laser LS is emitted may be different from the refractive index of the parent substrate P-PG before the laser LS is emitted. The laser LS may have an intensity that changes the refractive index of a portion of the mother substrate P-PG without cutting the portion of the mother substrate P-PG.

The laser LS may have pulse energy. The laser LS may have pulse duration ranging from several hundreds of picoseconds to several tens of femtoseconds. For example, the pulse duration of the laser LS may be about 200 picoseconds or less. The pulse duration of the laser LS may vary depending on the material or thickness of the parent substrate P-PG. The laser LS may have a wavelength of about 250 nm to about 1500 nm. In an embodiment, the laser LS may have a wavelength of about 340 nm to about 1060 nm.

The laser LS may be a non-diffractive beam. For example, the laser LS may be a Bessel beam. However, the inventive concept is not limited thereto, and the laser LS may be, for example, a Gaussian beam according to embodiments.

FIG. 9B is a cross-sectional view of a mother substrate P-PG after the laser LS (see FIG. 9A) is emitted. The laser LS (see FIG. 9A) may be emitted to the first lines GL11, GL12, and GL13 to form first portions P11-1, P11-2, P12-1, P12-2, P13-1, and P13-2. The laser LS (see FIG. 9A) may be emitted to the second lines GL21, GL22, and GL23 to form second portions P21, P22, and P23. To the naked eye, the first portions P11-1, P11-2, P12-1, P12-2, P13-1, and P13-2 and the second portions P21, P22, and P23 may be hardly distinguishable from portions that are not laser-irradiated. However, for convenience of illustration in the figures, the laser-irradiated first portions P11-1, P11-2, P12-1, P12-2, P13-1, and P13-2 and the second portions P21, P22, and P23 are shown as hatched regions.

After the laser-irradiation, the refractive indices of the first portions P11-1, P11-2, P12-1, P12-2, P13-1, and P13-2 and the second portions P21, P22, and P23 are different from the refractive index of the parent substrate P-PG before the laser-irradiation.

The first portions P11-1, P11-2, P12-1, P12-2, P13-1, and P13-2 and the second portions P21, P22, and P23 may each be formed to have a predetermined diameter on a plane. For example, the first portion P11-1, P11-2, P12-1, P12-2, P13-1, and P13-2 and the second portions P21, P22, and P23 may each have a diameter of about 3 μm or less. As the laser LS changes the refractive index without forming a physical hole in the parent substrate P-PG, and the size of the portions where the refractive index is changed is also small, the changes in appearance of the mother substrate P-PG by the laser are unlikely to be viewed to the naked eye, and may be viewed using, for example, a high-magnification microscope.

Each of the first portions P11-1, P11-2, P12-1, P12-2, P13-1, and P13-2 and the second portions P21, P22, and P23 may extend along the third direction DR3. The first portions P11-1, P11-2, P12-1, P12-2, P13-1, and P13-2 may be formed to be spaced apart from each other by a predetermined interval. The second portions P21, P22, and P23 may be formed to be spaced apart from each other by a predetermined interval. The predetermined interval may be on the scale of several micrometers (µm).

Each of the first portions P11-1, P11-2, P12-1, P12-2, P13-1, and P13-2 and the second portions P21, P22, and P23 may be spaced apart from each other by a predetermined interval along the second direction DR2. Intervals between grooves GU-S1, GB-S1, GU-C, and GB-C (see FIG. 9C) to be formed may vary according to intervals between the first portions P11-1, P11-2, P12-1, P12-2, P13-1, and P13-2 and the second portions P21, P22, and P23.

The first portions P11-1, P11-2, P12-1, P12-2, P13-1, and P13-2 and the second portions P21, P22, and P23 may each have a predetermined thickness along a thickness direction. The thickness of each of the first portions P11-1, P11-2, P12-1, P12-2, P13-1, and P13-2 and the second portions P21, P22, and P23 may be smaller than the thickness of the mother substrate P-PG. By controlling the intensity of the laser, the thickness of the first portions P11-1, P11-2, P12-1, P12-2, P13-1, and P13-2 and the second portions P21, P22, and P23 may be controlled. Depths of each of the grooves GU-S1, GB-S1, GU-C, and GB-C (see FIG. 9C) to be formed may vary according to the thickness of the first portions P11-1, P11-2, P12-1, P12-2, P13-1, and P13-2 and the second portions P21, P22, and P23.

As described above, as the first lines GL11, GL12, and GL13 and the second lines GL21, GL22, and GL23 are provided in a plurality of rows, the first portions P11-1, P11-2, P12-1, P12-2, P13-1, and P13-2 and the second portions P21, P22, and P23 may also be formed in a plurality of rows.

An etching solution ES may be provided on the first portions P11-1, P11-2, P12-1, P12-2, P13-1, and P13-2 and the second portions P21, P22, and P23. The etching solution ES may be provided through, for example, a spray method or a dipping method, but is not limited thereto. The etching solution ES may etch a portion of the mother substrate P-PG around the first portions P11-1, P11-2, P12-1, P12-2, P13-1, and P13-2 and the second portions P21, P22, and P23.

The etching solution ES may include an alkali solution. For example, the etching solution ES may include a sodium hydroxide (NaOH) solution or a potassium hydroxide (KOH) solution. In an embodiment, the etching solution ES may include a sodium hydroxide solution.

Shapes of the grooves GU-S1, GB-S1, GU-C, and GB-C (see FIG. 9C) may vary depending on an etching rate or an amount of etching. When the concentration and temperature of the etching solution ES increase, the etching rate may increase. The amount of etching may increase when exposure time to the etching solution ES, that is, the etching time increases.

For example, when the temperature of the etching solution ES increases, the etching solution ES may have greater reactivity, thereby increasing the etching rate. The temperature of the etching solution ES may be room temperature or higher. For example, the temperature of the etching solution ES may be about 100° C. to about 150° C. When the temperature of the etching solution ES is lower than about 100° C., the etching solution ES may have less reactivity, and a process time for forming grooves may increase. When the temperature of the etching solution ES is higher than about 150° C., the mother substrate P-PG may be damaged due to exposure to high temperature.

FIG. 9C shows a cross-sectional view of a substrate in which the grooves GU-S1, GB-S1, GU-C, and GB-C are formed in a predetermined time after exposure to the etching solution ES in the process shown in FIG. 9B.

The plurality of grooves GU-S1, GB-S1, GU-C, and GB-C may be formed such that a portion of the substrate PG is recessed through the laser-irradiating (S21) and etching (S22) described above. In this case, the substrate PG may correspond to the mother substrate P-PG in which the plurality of grooves GU-S1, GB-S1, GU-C, and GB-C are formed. The description provided above with reference to FIGS. 6A to 6E may be equally applied to the descriptions of the plurality of grooves GU-S1, GB-S1, GU-C, and GB-C. For example, first groove patterns GU-C and GB-C having a zigzag arrangement may be formed in the center area FA-C of the substrate PG, and second groove patterns GU-S1 and GB-S1 partially overlapping in the second direction DR2 may be formed in the outer area FA-S1 of the substrate PG. FIG. 9C shows, as an example, that the first groove patterns GU-C and GB-C and the second groove patterns GU-S1 and GB-S1 are formed in the arrangement shown in FIG. 6A, but the inventive concept is not limited thereto. For example, according to embodiments, the groove patterns may be formed in the arrangement shown in FIGS. 6B to 6E through the method of manufacturing a window according to an embodiment.

According to embodiments of the inventive concept, a window includes a plurality of groove patterns provided in a folding portion, in which the plurality of groove patterns include upper groove patterns provided on an upper surface of a window substrate and lower groove patterns provided on a lower surface of the window substrate. The window may have a structure in which the arrangement of the groove patterns is different depending on the distance from a folding axis. Accordingly, a window having increased durability by reducing stress applied upon folding, and a display device including the same, may be provided. Thus, a window, and a display device including the same, in which damage to folding may be prevented or reduced, may be provided.

While the inventive concept has been particularly shown and described with reference to embodiments thereof, it will be understood by those of ordinary skill in the art that various changes in form and detail may be made therein without departing from the spirit and scope of the present invention as defined by the following claims.

What is claimed is:

1. A window, comprising:
a substrate including a folding portion foldable with respect to a folding axis extending in a first direction, and a first non-folding portion and a second non-folding portion spaced apart from each other in a second direction substantially perpendicular to the first direction with the folding portion disposed therebetween,
wherein a plurality of groove patterns each extending in the first direction and arranged in the second direction are disposed in the folding portion,
the folding portion includes a center portion disposed adjacent to the folding axis, and an outer portion disposed between the center portion and each of the first non-folding portion and the second non-folding portion, the plurality of groove patterns include a first groove pattern disposed in the center portion and a second groove pattern disposed in the outer portion, the first groove pattern includes a first upper groove pattern recessed from an upper surface of the substrate, and a first lower groove pattern recessed from a lower surface of the substrate, the second groove pattern includes a second upper groove pattern recessed from the upper surface of the substrate, and a second lower groove pattern recessed from the lower surface of the substrate, the first upper groove pattern and the first lower groove pattern are alternately disposed in the second direction such that the first upper groove pattern and the first lower groove pattern do not overlap each other in a thickness direction of the substrate, the second upper groove pattern and the second lower groove pattern do not overlap in the second direction, and the second upper groove pattern and the second lower groove pattern do not overlap in the thickness direction of the substrate.

2. The window of claim 1, wherein a depth of the second upper groove pattern is substantially equal to a depth of the second lower groove pattern.

3. The window of claim 1, wherein a depth of the second upper groove pattern is different from a depth of the second lower groove pattern.

4. The window of claim 1, wherein a depth of the second upper groove pattern is greater than a depth of the second lower groove pattern.

5. The window of claim 1, wherein the substrate has a thickness of about 100 μm to about 1000 μm.

6. The window of claim 1, wherein each of the plurality of groove patterns has a width in the second direction of about 20 μm to about 300 μm.

7. The window of claim 1, further comprising:
a filling member disposed in each of the plurality of groove patterns.

8. The window of claim 7, wherein the filling member comprises an elastic material.

9. The window of claim 1, wherein a depth of the first upper groove pattern is substantially equal to a depth of the first lower groove pattern.

10. The window of claim 1, wherein a depth of each of the first upper groove pattern and the first lower groove pattern is more than half a thickness of the substrate.

11. The window of claim 1, wherein the plurality of groove patterns do not overlap the first non-folding portion and the second non-folding portion.

12. A window, comprising:
a substrate including a folding portion foldable with respect to a folding axis extending in a first direction, and a first non-folding portion and a second non-folding portion spaced apart from each other in a second direction substantially perpendicular to the first direction with the folding portion disposed therebetween,
wherein a plurality of groove patterns each extending in the first direction and arranged in the second direction are disposed in the folding portion,
the folding portion includes a center portion disposed adjacent to the folding axis, and an outer portion disposed between the center portion and each of the first non-folding portion and the second non-folding portion, the plurality of groove patterns include a first groove pattern disposed in the center portion and a second groove pattern disposed in the outer portion, the first groove pattern includes a first upper groove pattern recessed from an upper surface of the substrate, and a first lower groove pattern recessed from a lower surface of the substrate, the second groove pattern includes a second upper groove pattern recessed from the upper surface of the substrate, and a second lower groove pattern recessed from the lower surface of the substrate, the first upper groove pattern and the first lower groove pattern are alternately disposed in the second direction such that the first upper groove pattern and the first lower groove pattern do not overlap each other in a thickness direction of the substrate, the second upper groove pattern and the second lower groove pattern do not overlap in the second direction, and the plurality of groove patterns are symmetrical with respect to the folding axis.

13. An electronic device, comprising:
a foldable display module; and
a window disposed on the foldable display module, wherein the window is foldable with the foldable display module,
wherein the window includes:
a substrate including a folding portion foldable with respect to a folding axis extending in a first direction, and a first non-folding portion and a second non-folding portion spaced apart from each other in a second direction substantially perpendicular to the first direction with the folding portion disposed therebetween,
wherein a plurality of groove patterns each extending in the first direction and arranged in the second direction are defined in the folding portion,
the folding portion includes a center portion disposed adjacent to the folding axis, and an outer portion disposed between the center portion and each of the first non-folding portion and the second non-folding portion,
the plurality of groove patterns include a first groove pattern disposed in the center portion and a second groove pattern disposed in the outer portion,
the first groove pattern includes a first upper groove pattern recessed from an upper surface of the substrate, and a first lower groove pattern recessed from a lower surface of the substrate,
the second groove pattern includes a second upper groove pattern recessed from the upper surface of the substrate, and a second lower groove pattern recessed from the lower surface of the substrate,
the first upper groove pattern and the first lower groove pattern are alternately disposed in the second direction such that the first upper groove pattern and the first lower groove pattern do not overlap each other in a thickness direction of the substrate,
the second upper groove pattern and the second lower groove pattern do not overlap in the second direction, and
the second upper groove pattern and the second lower groove pattern do not overlap in the thickness direction of the substrate.

14. The electronic device of claim 13, wherein the lower surface of the substrate is adjacent to the foldable display module, and
the upper surface of the substrate is spaced apart from the foldable display module with the lower surface disposed therebetween.

15. The electronic device of claim 13, wherein the plurality of groove patterns do not overlap the first non-folding portion and the second non-folding portion.

\* \* \* \* \*